(12) United States Patent
Ducott, III et al.

(10) Patent No.: US 11,693,877 B2
(45) Date of Patent: *Jul. 4, 2023

(54) CROSS-ONTOLOGY MULTI-MASTER REPLICATION

(71) Applicant: Palantir Technologies Inc., Palo Alto, CA (US)

(72) Inventors: Richard Allen Ducott, III, Palo Alto, CA (US); John Kenneth Garrod, Palo Alto, CA (US); John Antonio Carrino, Palo Alto, CA (US); Katherine Brainard, Palo Alto, CA (US)

(73) Assignee: Palantir Technologies Inc., Denver, CO (US)

( * ) Notice: Subject to any disclaimer, the term of this patent is extended or adjusted under 35 U.S.C. 154(b) by 758 days.

This patent is subject to a terminal disclaimer.

(21) Appl. No.: 16/053,445

(22) Filed: Aug. 2, 2018

(65) Prior Publication Data

US 2019/0138533 A1 May 9, 2019

Related U.S. Application Data

(60) Continuation of application No. 15/143,780, filed on May 2, 2016, now Pat. No. 10,061,828, which is a
(Continued)

(51) Int. Cl.
*G06F 16/25* (2019.01)
*G06N 5/02* (2023.01)
(Continued)

(52) U.S. Cl.
CPC ............ *G06F 16/258* (2019.01); *G06F 16/27* (2019.01); *G06F 16/955* (2019.01); *G06N 5/02* (2013.01)

(58) Field of Classification Search
CPC ...... G06F 16/258; G06F 16/27; G06F 16/955; G06F 16/1794; G06F 16/273; G06F 16/275; G06F 16/278; G06F 7/00; G06N 5/02
See application file for complete search history.

(56) References Cited

U.S. PATENT DOCUMENTS

| 4,853,843 A | 8/1989 | Ecklund |
| 5,548,749 A | 8/1996 | Kroenke et al. |

(Continued)

FOREIGN PATENT DOCUMENTS

| CN | 102054015 | 5/2014 |
| DE | 102014204827 | 9/2014 |

(Continued)

OTHER PUBLICATIONS

Miller, The intelligence coup of the century Feb. 11, 2020, Washington Post, https://www.washingtonpost.com/graphics/2020/world/national-security/cia-crypto-encryption-machines-espionage/.*
(Continued)

*Primary Examiner* — Vaishali Shah
(74) *Attorney, Agent, or Firm* — Duane Morris LLP

(57) ABSTRACT

A system and method providing cross-ontology multi-master replication is described. In a first embodiment a method for cross-ontology multi-master replication comprising the steps of: storing a database change comprising a property value, the property value having an exporting site property type as defined in an exporting site ontology for an exporting site; using an ontology map to map the exporting site property type to an importing site property type defined by an importing site ontology for an importing site; transforming the property value to an intermediate property value based on the importing site property type; transforming the intermediate property value to a first round-trip value based on the exporting site property type; and determining whether
(Continued)

to export the database change to the importing site based at least in part on a comparison between the property value and the first round-trip value.

15 Claims, 9 Drawing Sheets

Related U.S. Application Data division of application No. 14/156,208, filed on Jan. 15, 2014, now Pat. No. 9,330,157, which is a continuation of application No. 13/076,804, filed on Mar. 31, 2011, now Pat. No. 8,688,749.

(51) Int. Cl.
*G06F 16/27* (2019.01)
*G06F 16/955* (2019.01)

(56) References Cited

U.S. PATENT DOCUMENTS

| | | |
|---|---|---|
| 5,708,828 A | 1/1998 | Coleman |
| 5,737,601 A | 4/1998 | Jain et al. |
| 5,765,171 A | 6/1998 | Gehani et al. |
| 5,806,074 A | 9/1998 | Souder et al. |
| 5,826,021 A | 10/1998 | Mastors et al. |
| 5,832,218 A | 11/1998 | Gibbs et al. |
| 5,870,761 A | 2/1999 | Demers et al. |
| 5,878,434 A | 3/1999 | Draper et al. |
| 5,897,636 A | 4/1999 | Kaeser |
| 5,966,706 A | 10/1999 | Biliris et al. |
| 6,006,242 A | 12/1999 | Poole et al. |
| 6,057,757 A | 5/2000 | Arrowsmith et al. |
| 6,058,401 A | 5/2000 | Stamos et al. |
| 6,098,078 A | 8/2000 | Gehani et al. |
| 6,134,582 A | 10/2000 | Kennedy |
| 6,190,053 B1 | 2/2001 | Stahlecker et al. |
| 6,202,085 B1 | 3/2001 | Benson et al. |
| 6,216,140 B1 | 4/2001 | Kramer |
| 6,240,414 B1 | 5/2001 | Beizer et al. |
| 6,243,717 B1 | 6/2001 | Gordon et al. |
| 6,308,178 B1 * | 10/2001 | Chang .................. G06F 16/258 |
| 6,317,754 B1 | 11/2001 | Peng |
| 6,374,252 B1 | 4/2002 | Althoff et al. |
| 6,430,305 B1 | 8/2002 | Decker |
| 6,463,404 B1 | 10/2002 | Appleby |
| 6,519,627 B1 | 2/2003 | Dan et al. |
| 6,523,019 B1 | 2/2003 | Borthwick |
| 6,523,172 B1 | 2/2003 | Martinez-Guerra et al. |
| 6,539,381 B1 | 3/2003 | Prasad et al. |
| 6,560,620 B1 | 5/2003 | Ching |
| 6,615,223 B1 * | 9/2003 | Shih ...................... G06F 16/27 |
| | | 707/625 |
| 6,711,624 B1 * | 3/2004 | Narurkar .............. G06F 16/258 |
| | | 719/321 |
| 6,816,941 B1 | 11/2004 | Carlson et al. |
| 6,996,589 B1 * | 2/2006 | Jayaram ............... G06F 16/258 |
| 7,058,648 B1 | 6/2006 | Lightfoot et al. |
| 7,072,911 B1 | 7/2006 | Doman |
| 7,089,541 B2 | 8/2006 | Ungar |
| 7,167,877 B2 | 1/2007 | Balogh et al. |
| 7,403,942 B1 | 7/2008 | Bayliss |
| 7,437,664 B2 | 10/2008 | Borson |
| 7,461,158 B2 | 12/2008 | Rider et al. |
| 7,596,285 B2 | 9/2009 | Brown et al. |
| 7,627,489 B2 | 12/2009 | Schaeffer et al. |
| 7,676,788 B1 | 3/2010 | Ousterhout et al. |
| 7,730,396 B2 | 6/2010 | Chidlovskii et al. |
| 7,739,246 B2 | 6/2010 | Mooney et al. |
| 7,752,403 B1 | 7/2010 | Weinman |
| 7,756,882 B2 * | 7/2010 | Aharoni ................ G06F 16/86 |
| | | 707/756 |
| 7,757,220 B2 | 7/2010 | Griffith et al. |
| 7,818,297 B2 | 10/2010 | Peleg et al. |
| 7,822,711 B1 | 10/2010 | Ranade |
| 7,877,421 B2 | 1/2011 | Berger et al. |
| 7,912,842 B1 | 3/2011 | Bayliss |
| 7,953,710 B2 | 5/2011 | Novik et al. |
| 7,962,495 B2 | 6/2011 | Jain et al. |
| 8,015,151 B2 | 9/2011 | Lier et al. |
| 8,117,022 B2 | 2/2012 | Linker |
| 8,126,848 B2 | 2/2012 | Wagner |
| 8,147,715 B2 | 4/2012 | Hirosaki et al. |
| 8,290,838 B1 | 10/2012 | Thakur et al. |
| 8,290,990 B2 | 10/2012 | Drath et al. |
| 8,301,904 B1 | 10/2012 | Gryaznov |
| 8,302,855 B2 | 11/2012 | Ma et al. |
| 8,312,546 B2 | 11/2012 | Aime |
| 8,316,060 B1 | 11/2012 | Snyder et al. |
| 8,364,642 B1 | 1/2013 | Garrod |
| 8,380,659 B2 | 2/2013 | Zunger |
| 8,386,377 B1 | 2/2013 | Xiong et al. |
| 8,429,527 B1 | 4/2013 | Arbogast |
| 8,442,940 B1 | 5/2013 | Faletti et al. |
| 8,515,912 B2 | 8/2013 | Garrod et al. |
| 8,527,461 B2 | 9/2013 | Ducott, III et al. |
| 8,554,719 B2 | 10/2013 | McGrew |
| 8,601,326 B1 | 12/2013 | Kim |
| 8,639,552 B1 | 1/2014 | Chen et al. |
| 8,646,080 B2 | 2/2014 | Williamson et al. |
| 8,688,573 B1 | 4/2014 | Rukonic et al. |
| 8,688,749 B1 | 4/2014 | Ducott, III et al. |
| 8,726,379 B1 | 5/2014 | Stiansen et al. |
| 8,782,004 B2 | 7/2014 | Ducott, III et al. |
| 8,798,354 B1 | 8/2014 | Bunzel et al. |
| 8,812,444 B2 | 8/2014 | Garrod et al. |
| 8,838,538 B1 | 9/2014 | Landau et al. |
| 8,855,999 B1 | 10/2014 | Elliot |
| 8,886,601 B1 | 11/2014 | Landau et al. |
| 8,903,717 B2 | 12/2014 | Elliot |
| 8,924,388 B2 | 12/2014 | Elliot et al. |
| 8,924,389 B2 | 12/2014 | Elliot et al. |
| 8,938,434 B2 | 1/2015 | Jain et al. |
| 8,938,686 B1 | 1/2015 | Erenrich et al. |
| 9,009,827 B1 | 4/2015 | Albertson et al. |
| 9,105,000 B1 | 8/2015 | White et al. |
| 9,189,492 B2 | 11/2015 | Ducott, III et al. |
| 9,230,060 B2 | 1/2016 | Friedlander et al. |
| 9,330,157 B2 | 5/2016 | Ducott, III et al. |
| 9,501,552 B2 | 11/2016 | McGrew et al. |
| 9,569,070 B1 | 2/2017 | Ma et al. |
| 9,715,518 B2 | 7/2017 | Ducott, III et al. |
| 9,785,694 B2 | 10/2017 | Landau et al. |
| 2002/0035590 A1 | 3/2002 | Eibach et al. |
| 2002/0040359 A1 * | 4/2002 | Green ................... G06F 40/30 |
| 2002/0095360 A1 | 7/2002 | Joao |
| 2002/0103705 A1 | 8/2002 | Brady |
| 2002/0194058 A1 | 12/2002 | Eldering |
| 2003/0084017 A1 | 5/2003 | Ordille |
| 2003/0088438 A1 | 5/2003 | Maughan et al. |
| 2003/0088654 A1 | 5/2003 | Good et al. |
| 2003/0093401 A1 | 5/2003 | Czahowski et al. |
| 2003/0105759 A1 | 6/2003 | Bess et al. |
| 2003/0115481 A1 | 6/2003 | Baird et al. |
| 2003/0126102 A1 | 7/2003 | Borthwick |
| 2003/0149934 A1 * | 8/2003 | Worden ............... G06F 16/252 |
| | | 715/239 |
| 2003/0171942 A1 | 9/2003 | Gaito |
| 2003/0177112 A1 | 9/2003 | Gardner |
| 2003/0182313 A1 | 9/2003 | Federwisch et al. |
| 2003/0212718 A1 | 11/2003 | Tester |
| 2004/0003009 A1 | 1/2004 | Wilmot |
| 2004/0006523 A1 | 1/2004 | Coker |
| 2004/0034570 A1 | 2/2004 | Davis |
| 2004/0083466 A1 | 4/2004 | Dapp et al. |
| 2004/0088177 A1 | 5/2004 | Travis et al. |
| 2004/0103124 A1 | 5/2004 | Kupkova |
| 2004/0111390 A1 | 6/2004 | Saito et al. |
| 2004/0117387 A1 | 6/2004 | Civetta et al. |
| 2004/0153451 A1 | 8/2004 | Philips et al. |
| 2004/0205619 A1 * | 10/2004 | Twede ................. G06F 40/151 |
| | | 715/249 |
| 2004/0210763 A1 | 10/2004 | Jonas |

(56) References Cited

U.S. PATENT DOCUMENTS

| | | |
|---|---|---|
| 2004/0236688 A1 | 11/2004 | Bozeman |
| 2004/0250576 A1 | 12/2004 | Flanders |
| 2005/0010472 A1 | 1/2005 | Quatse et al. |
| 2005/0034107 A1 | 2/2005 | Kendall et al. |
| 2005/0044088 A1 | 2/2005 | Lindsay et al. |
| 2005/0097441 A1 | 5/2005 | Herbach et al. |
| 2005/0102328 A1 | 5/2005 | Ring et al. |
| 2005/0108063 A1 | 5/2005 | Madill et al. |
| 2005/0131935 A1 | 6/2005 | O'Leary et al. |
| 2005/0149484 A1* | 7/2005 | Fox .................. G06F 16/25 |
| 2005/0193024 A1 | 9/2005 | Beyer et al. |
| 2005/0251786 A1 | 11/2005 | Citron et al. |
| 2005/0262512 A1 | 11/2005 | Schmidt et al. |
| 2006/0004854 A1* | 1/2006 | Okunseinde .......... G06F 16/25 |
| 2006/0010130 A1 | 1/2006 | Left et al. |
| 2006/0036568 A1 | 2/2006 | Moore et al. |
| 2006/0080283 A1 | 4/2006 | Shipman |
| 2006/0080316 A1 | 4/2006 | Gilmore et al. |
| 2006/0106879 A1 | 5/2006 | Zondervan et al. |
| 2006/0143075 A1 | 6/2006 | Carr et al. |
| 2006/0155945 A1* | 7/2006 | McGarvey ............ H04L 67/10 |
| | | 711/159 |
| 2006/0178954 A1 | 8/2006 | Thukral et al. |
| 2006/0190497 A1 | 8/2006 | Inturi et al. |
| 2006/0206866 A1 | 9/2006 | Eldrige et al. |
| 2006/0218206 A1 | 9/2006 | Bourbonnais et al. |
| 2006/0218637 A1 | 9/2006 | Thomas et al. |
| 2006/0218941 A1 | 9/2006 | Drube et al. |
| 2006/0224579 A1 | 10/2006 | Zheng |
| 2006/0253502 A1 | 11/2006 | Raman et al. |
| 2007/0000999 A1 | 1/2007 | Kubo et al. |
| 2007/0005707 A1 | 1/2007 | Teodosiu et al. |
| 2007/0026373 A1 | 2/2007 | Suriyanarayanan et al. |
| 2007/0038651 A1* | 2/2007 | Bernstein ............. G06F 16/28 |
| 2007/0067285 A1 | 3/2007 | Blume |
| 2007/0112887 A1 | 5/2007 | Liu et al. |
| 2007/0162454 A1 | 7/2007 | D'Albora et al. |
| 2007/0168516 A1 | 7/2007 | Liu et al. |
| 2007/0178501 A1 | 8/2007 | Rabinowitz et al. |
| 2007/0180075 A1 | 8/2007 | Chasman et al. |
| 2007/0192122 A1 | 8/2007 | Routson et al. |
| 2007/0203923 A1* | 8/2007 | Thomas ............... G06F 16/212 |
| 2007/0220328 A1 | 9/2007 | Liu et al. |
| 2007/0233756 A1 | 10/2007 | D'Souza et al. |
| 2007/0271317 A1 | 11/2007 | Carmel |
| 2007/0284433 A1 | 12/2007 | Domenica et al. |
| 2007/0295797 A1 | 12/2007 | Herman et al. |
| 2007/0299697 A1 | 12/2007 | Friedlander et al. |
| 2007/0299887 A1 | 12/2007 | Novik et al. |
| 2008/0005063 A1 | 1/2008 | Seeds |
| 2008/0005188 A1 | 1/2008 | Li et al. |
| 2008/0027981 A1 | 1/2008 | Wahl |
| 2008/0033753 A1 | 2/2008 | Canda et al. |
| 2008/0086718 A1 | 4/2008 | Bostick et al. |
| 2008/0126344 A1 | 5/2008 | Hoffman et al. |
| 2008/0126951 A1 | 5/2008 | Sood et al. |
| 2008/0140387 A1 | 6/2008 | Linker |
| 2008/0141117 A1 | 6/2008 | King et al. |
| 2008/0148398 A1 | 6/2008 | Mezack et al. |
| 2008/0189240 A1 | 8/2008 | Mullins et al. |
| 2008/0195672 A1 | 8/2008 | Hamel et al. |
| 2008/0208735 A1 | 8/2008 | Balet et al. |
| 2008/0228467 A1 | 9/2008 | Womack et al. |
| 2008/0235575 A1 | 9/2008 | Weiss |
| 2008/0243951 A1 | 10/2008 | Webman et al. |
| 2008/0267386 A1 | 10/2008 | Cooper |
| 2008/0270316 A1 | 10/2008 | Guidotti et al. |
| 2008/0270340 A1* | 10/2008 | Abrams ................ G06F 16/254 |
| | | 707/999.102 |
| 2008/0281580 A1 | 11/2008 | Zabokritski |
| 2008/0301042 A1 | 12/2008 | Patzer |
| 2008/0313132 A1 | 12/2008 | Hao et al. |
| 2008/0320299 A1 | 12/2008 | Wobber et al. |
| 2009/0055487 A1 | 2/2009 | Moraes et al. |
| 2009/0094270 A1 | 4/2009 | Alirez et al. |
| 2009/0106178 A1 | 4/2009 | Chu |
| 2009/0106242 A1 | 4/2009 | McGrew et al. |
| 2009/0112745 A1 | 4/2009 | Stefanescu |
| 2009/0157732 A1 | 6/2009 | Hao et al. |
| 2009/0164387 A1 | 6/2009 | Armstrong et al. |
| 2009/0172821 A1 | 7/2009 | Daira et al. |
| 2009/0187546 A1 | 7/2009 | Whyte et al. |
| 2009/0199090 A1 | 8/2009 | Poston et al. |
| 2009/0228365 A1 | 9/2009 | Tomchek et al. |
| 2009/0228507 A1* | 9/2009 | Jain .................... G06F 16/22 |
| | | 707/999.102 |
| 2009/0249244 A1 | 10/2009 | Robinson et al. |
| 2009/0254970 A1 | 10/2009 | Agarwal et al. |
| 2009/0271343 A1 | 10/2009 | Vaiciulis et al. |
| 2009/0299830 A1 | 12/2009 | West et al. |
| 2009/0307049 A1 | 12/2009 | Elliott et al. |
| 2009/0313311 A1 | 12/2009 | Hoffmann et al. |
| 2009/0313463 A1 | 12/2009 | Pang et al. |
| 2009/0319418 A1 | 12/2009 | Herz |
| 2009/0319515 A1 | 12/2009 | Minton et al. |
| 2010/0011000 A1 | 1/2010 | Chakra et al. |
| 2010/0057622 A1 | 3/2010 | Faith et al. |
| 2010/0070531 A1 | 3/2010 | Aymeloglu et al. |
| 2010/0070842 A1 | 3/2010 | Aymeloglu et al. |
| 2010/0082541 A1 | 4/2010 | Kottomtharayil |
| 2010/0082671 A1 | 4/2010 | Li et al. |
| 2010/0098318 A1 | 4/2010 | Anderson |
| 2010/0100963 A1 | 4/2010 | Mahaffey |
| 2010/0114817 A1 | 5/2010 | Broeder et al. |
| 2010/0145909 A1 | 6/2010 | Ngo |
| 2010/0204983 A1 | 8/2010 | Chung et al. |
| 2010/0306285 A1 | 12/2010 | Shah et al. |
| 2010/0330801 A1 | 12/2010 | Rouh |
| 2011/0004626 A1 | 1/2011 | Naeymi-Rad et al. |
| 2011/0010342 A1 | 1/2011 | Chen et al. |
| 2011/0066497 A1 | 3/2011 | Gopinath et al. |
| 2011/0093327 A1 | 4/2011 | Fordyce et al. |
| 2011/0099133 A1 | 4/2011 | Chang et al. |
| 2011/0173093 A1 | 7/2011 | Psota et al. |
| 2011/0208565 A1 | 8/2011 | Ross et al. |
| 2011/0208822 A1 | 8/2011 | Rathod |
| 2011/0219450 A1 | 9/2011 | McDougal et al. |
| 2011/0225586 A1 | 9/2011 | Bentley et al. |
| 2011/0246229 A1 | 10/2011 | Pacha |
| 2011/0252282 A1* | 10/2011 | Meek ................... G06F 16/25 |
| | | 714/54 |
| 2011/0258216 A1 | 10/2011 | Supakkul et al. |
| 2012/0005159 A1 | 1/2012 | Wang et al. |
| 2012/0005614 A1* | 1/2012 | Menezes ............. G06F 16/258 |
| | | 707/809 |
| 2012/0013684 A1 | 1/2012 | Robertson et al. |
| 2012/0016849 A1 | 1/2012 | Garrod et al. |
| 2012/0022945 A1 | 1/2012 | Falkenborg et al. |
| 2012/0023075 A1 | 1/2012 | Pulfer et al. |
| 2012/0036106 A1 | 2/2012 | Desai et al. |
| 2012/0059853 A1 | 3/2012 | Jagota |
| 2012/0066661 A1 | 3/2012 | Balani |
| 2012/0078595 A1 | 3/2012 | Balandin et al. |
| 2012/0084287 A1 | 4/2012 | Lakshminarayan et al. |
| 2012/0089606 A1 | 4/2012 | Eshwar et al. |
| 2012/0191446 A1 | 7/2012 | Binsztok et al. |
| 2012/0215784 A1 | 8/2012 | King et al. |
| 2012/0254129 A1 | 10/2012 | Wheeler et al. |
| 2013/0006655 A1 | 1/2013 | Van Arkel et al. |
| 2013/0006668 A1 | 1/2013 | Van Arkel et al. |
| 2013/0006947 A1 | 1/2013 | Akinyemi et al. |
| 2013/0067017 A1 | 3/2013 | Carriere et al. |
| 2013/0096968 A1 | 4/2013 | Van Pelt et al. |
| 2013/0097130 A1 | 4/2013 | Bingol et al. |
| 2013/0124193 A1 | 5/2013 | Holmberg |
| 2013/0132348 A1 | 5/2013 | Garrod |
| 2013/0151453 A1 | 6/2013 | Bhanot et al. |
| 2013/0166480 A1 | 6/2013 | Popsecu et al. |
| 2013/0173540 A1 | 7/2013 | Qian et al. |
| 2013/0191336 A1 | 7/2013 | Ducott et al. |
| 2013/0191338 A1 | 7/2013 | Ducott, III et al. |
| 2013/0208565 A1 | 8/2013 | Orji et al. |
| 2013/0226879 A1 | 8/2013 | Talukder et al. |
| 2013/0226944 A1 | 8/2013 | Baid et al. |

(56) References Cited

U.S. PATENT DOCUMENTS

| | | |
|---|---|---|
| 2013/0246316 A1 | 9/2013 | Zhao et al. |
| 2013/0251233 A1 | 9/2013 | Yang et al. |
| 2013/0263019 A1 | 10/2013 | Castellanos et al. |
| 2013/0276799 A1 | 10/2013 | Davidson |
| 2013/0325826 A1 | 12/2013 | Agarwal et al. |
| 2013/0346444 A1 | 12/2013 | Makkar et al. |
| 2014/0006404 A1 | 1/2014 | McGrew et al. |
| 2014/0040182 A1 | 2/2014 | Gilder et al. |
| 2014/0040714 A1 | 2/2014 | Siegel et al. |
| 2014/0081652 A1 | 3/2014 | Klindworth |
| 2014/0095363 A1 | 4/2014 | Caldwell |
| 2014/0108074 A1 | 4/2014 | Miller et al. |
| 2014/0114972 A1 | 4/2014 | Ducott et al. |
| 2014/0129518 A1 | 5/2014 | Ducott et al. |
| 2014/0149130 A1 | 5/2014 | Getchius |
| 2014/0222793 A1 | 8/2014 | Sadkin et al. |
| 2014/0358829 A1 | 12/2014 | Hurwitz |
| 2015/0012509 A1 | 1/2015 | Kirn |
| 2015/0046481 A1 | 2/2015 | Elliot |
| 2015/0074050 A1 | 3/2015 | Landau et al. |
| 2015/0106379 A1 | 4/2015 | Elliot et al. |
| 2015/0235334 A1 | 8/2015 | Wang et al. |
| 2015/0261847 A1 | 9/2015 | Ducott et al. |
| 2016/0019252 A1 | 1/2016 | Ducott et al. |
| 2016/0246862 A1 | 8/2016 | Ducott, III et al. |
| 2018/0004832 A1 | 1/2018 | Landau et al. |

FOREIGN PATENT DOCUMENTS

| | | |
|---|---|---|
| DE | 102014204830 | 9/2014 |
| DE | 102014204834 | 9/2014 |
| DE | 102014213036 | 1/2015 |
| EP | 0 816 968 | 1/1996 |
| EP | 1647908 | 4/2006 |
| EP | 2487610 | 8/2012 |
| EP | 2778913 | 9/2014 |
| EP | 2778914 | 9/2014 |
| EP | 2911078 | 8/2015 |
| GB | 2366498 | 3/2002 |
| GB | 2513472 | 10/2014 |
| GB | 2513721 | 11/2014 |
| GB | 2517582 | 2/2015 |
| NL | 2013134 | 1/2015 |
| WO | WO 2008/113059 | 9/2008 |
| WO | WO 2009/051987 | 4/2009 |
| WO | WO 2010/030919 | 3/2010 |
| WO | WO 2011/161565 | 12/2011 |
| WO | WO 2012/009397 | 1/2012 |
| WO | WO 2012/061162 | 5/2012 |

OTHER PUBLICATIONS

Haplin, Ontological Modeling (Part 1) Sep. 2009, Business Rules Journal, vol. 10, http://www.brcommunity.com/a2009/b496.html.*
RDF Primer Feb. 10, 2004, W3C, https://www.w3.org/TR/rdf-primer/.*
Data integrity date unknown [captured on Apr. 6, 2001 by archive.org], webopedia.com, https://web.archive.org/web/20010406003512/https://www.webopedia.eom/TERM/D/data_integrity.html.*
Vanderbilt, Why Data Integrity is important to you 2008, Storage Networking Industry Association, https://web.archive.org/web/20010406003512/https://www.webopedia.com/TERM/D/data_integrity.html.*
Guardian Professional, Top 100 QS World University Rankings for computer science and information systems 2011 Sep. 5, 2011, The Guardian, https://www.theguardian.com/higher-education-network/2011/sep/05/top-100-universities-world-computer-science-and-information-systems-2011.*
Lowenthal, Intelligence: From Secrets to Policy 2000, CQ Press, pp. 75-97.*
Cyganiak, Next steps for RDF: Keep the core and pave the cowpaths 2009, W3.org, http://www.w3.org/2009/12/rdf-ws/papers/ws30.*
OWL Web Ontology Language Reference Feb. 2004, W3C, http://www.w3.org/TR/owl-ref/.*
A. M. Bittlingmayer, How good is a round-trip translation as a machine translation quality evaluation technique? Comment Mar. 16, 2014, stackexchange.com, https://linguistics.stackexchange.com/questions/16994/how-good-is-a-round-trip-translation-as-a-machine-translation-quality-evaluation.*
Bitters, A geographical Ontology of Objects in the Visible Domain 2005, Florida State University, 162 pages.*
Kalfoglou et al., Ontology Mapping: The State of the Art 2005, Dagstuhl Seminar Proceedings, 43 pages.*
Ouali et al, Ontology Alignmeng using Stable Matching 2019, Procedia Computer Science, pp. 746-755.*
Mostowfi et al., Improving Quality of Ontology: An Ontology Transformation Approach Apr. 7, 2006, 22nd International Conference on Data Engineering Workshops (ICDEW'06), 4 pages.*
Euzenat et al., Ontology matching benchmarks: Generation, stability, and discriminability May 27, 2013, Web Semantics: Science, Services and Agents on the World Wide Web, pp. 30-48.*
An, Yuan, Xiaohua Hu, and Il-Yeol Song. "Round-trip engineering for maintaining conceptual-relational mappings." International Conference on Advanced Information Systems Engineering. Springer, Berlin, Heidelberg, 2008. (Year: 2008).*
Czarnecki, Krzysztof, et al. "Bidirectional transformations: A cross-discipline perspective." International Conference on Theory and Practice of Model Transformations. Springer, Berlin, Heidelberg, 2009. (Year: 2009).*
Knublauch, Holger, and Thomas Rose. "Round-trip engineering of ontologies forknowledge-based systems." Proc. of the Twelfth International Conference on Software Engineering and Knowledge Engineering (SEKE), Chicago, IL. 2000. (Year: 2000).*
Hettel, Thomas, Michael Lawley, and Kerry Raymond. "Model synchronisation: Definitions for round-trip engineering." International Conference on Theory and Practice of Model Transformations. Springer, Berlin, Heidelberg, 2008. (Year: 2008).*
Bernstein, Philip A., and Sergey Melnik. "Model management 2.0: manipulating richer mappings." Proceedings of the 2007 ACM SIGMOD international conference on Management of data. 2007. (Year: 2007).*
Tirmizi, Syed Hamid, et al. "OBO & OWL: Roundtrip Ontology Transformations." SWAT4LS. 2009. (Year: 2009).*
Fidge, Colin J., "Timestamps in Message-Passing Systems," K. Raymond (Ed.) Proc. of the 11th Australian Computer Science Conference (ACSC 1988), pp. 56-66.
Holliday, JoAnne, "Replicated Database Recovery using Multicast Communication," IEEE 2002, pp. 11.
Lamport, "Time, Clocks and the Ordering of Events in a Distributed System," Communications of the ACM, Jul. 1978, vol. 21, No. 7, pp. 558-565.
Loeliger, Jon, "Version Control with Git," O'Reilly, May 2009, pp. 330.
Mattern, F., "Virtual Time and Global States of Distributed Systems," Cosnard, M., Proc. Workshop on Parallel and Distributed Algorithms, Chateau de Bonas, France: Elsevier, 1989, pp. 215-226.
O'Sullivan, Bryan, "Making Sense of Revision Control Systems," Communications of the ACM, Sep. 2009, vol. 52, No. 9, pp. 57-62.
Official Communication for Canadian Patent Application No. 2806954 dated Jan. 15, 2016.
Official Communication for European Patent Application No. 14159175.0 dated Feb. 4, 2016.
Official Communication for European Patent Application No. 15155845.9 dated Oct. 6, 2015.
Official Communication for European Patent Application No. 15156004.2 dated Aug. 24, 2015.
Parker, Jr. et al., "Detection of Mutual Inconsistency in Distributed Systems," IEEE Transactions in Software Engineering, May 1983, vol. SE-9, No. 3, pp. 241-247.
Symantec Corporation, "E-Security Begins with Sound Security Policies," Announcement Symantec, Jun. 14, 2001.
Pat, sheknows.com, http://webcache.googleusercontent.com/search?q=cacheAFQ6muzEa9W0J:www.sheknows.com/babynames/name/pat+&cd=13&hl=en&ct=clnk&gl=us.

(56) References Cited

OTHER PUBLICATIONS

Sommers, "Round-Trip Translation: What Is It Good For?", web.archive.org/web/2006070100000*/http://www.co.umist.ac.uk/~harold/RoundTrip.com, dated Sep. 24, 2006.
"A Real-World Problem of Matching Records," Nov. 2006, <http://grupoweb.upf.es/bd-web/slides/ullman.pdf> pp. 1-16.
Brandel, Mary, "Data Loss Prevention Dos and Don'ts," <http://web.archive.org/web/20080724024847/http://www.csoonline.com/article/221272/Dos_and_Don_ts_for_Data_Loss_Prevention>, Oct. 10, 2007, pp. 5.
Chaudhuri et al., "An Overview of Business Intelligence Technology," Communications of the ACM, Aug. 2011, vol. 54, No. 8.
Delicious, <http://delicious.com/> as printed May 15, 2014 in 1 page.
Dell Latitude D600 2003, Dell Inc., http://www.dell.com/downloads/global/products/latit/en/spec_latit_d600_en.pdf.
Dou et al., "Ontology Translaation on the Semantic Web 2005," Springer-Verlag, Journal on Data Semantics II Lecture Notes in Computer Science, vol. 3350, pp. 35-37.
"E-MailRelay," <http://web.archive.org/web/20080821175021/http://emailrelay.sourceforge.net/> Aug. 21, 2008, pp. 2.
Gill et al., "Computerised Linking of Medical Records: Methodological Guidelines," Journal of Epidemiology and Community Health, vol. 47, No. 4, Aug. 1, 1993, pp. 316-319.
Gu et al., "Record Linkage: Current Practice and Future Directions," Jan. 15, 2004, pp. 32.
Johnson, Maggie "Introduction to YACC and Bison".
Johnson, Steve, "Access 2013 on demand," Access 2013 on Demand, May 9, 2013, Que Publishing.
Lim et al., "Resolving Attribute Incompatibility in Database Integration: An Evidential Reasoning Approach," Department of Computer Science, University of Minnesota, 1994, <http://reference.kfupm.edu.sa/content/r/e/resolving_attribute_incompatibility_in_d_531691.pdf> pp. 1-10.
Litwin et al., "Multidatabase Interoperability," IEEE Computer, Dec. 1986, vol. 19, No. 12, http://www.lamsade.dauphine.fr/~litwin/mdb-interoperability.pdf, pp. 10-18.
Nadeau et al., "A Survey of Named Entity Recognition and Classification," Jan. 15, 2004, pp. 20.
Nin et al., "On the Use of Semantic Blocking Techniques for Data Cleansing and Integration," 11th International Database Engineering and Applications Symposium, 2007, pp. 9.
Pythagoras Communications Ltd., "Microsoft CRM Duplicate Detection," Sep. 13, 2011, https://www.youtube.com/watch?v=j-7Qis0D0Kc.
Qiang et al., "A Mutual-Information-Based Approach to Entity Reconciliation in Heterogeneous Databases," Proceedings of 2008 International Conference on Computer Science & Software Engineering, IEEE Computer Society, New York, NY. Dec. 12-14, 2008. pp. 666-669.
Sekine et al., "Definition, Dictionaries and Tagger for Extended Named Entity Hierarchy," May 2004, pp. 1977-1980.
Wang et al., "Research on a Clustering Data De-Duplication Mechanism Based on Bloom Filter," IEEE 2010, 5 pages.
Wikipedia, "Multimap," Jan. 1, 2013, https://en.wikipedia.org/w/index.php?title=Multimap&oldid=530800748.
Winkler, William E., "Bureau of the Census Statistical Research Division Record Linkage Software and Methods for Merging Administrative Lists," Statistical Research Report Series No. RR2001/03, Jul. 23, 2001, https://www.census.gov/srd/papers/pdf/rr2001-03.pdf, retrieved on Mar. 9, 2016.
Zhao et al., "Entity Matching Across Heterogeneous Data Sources: An Approach Based On Constrained Cascade Generalization," Data & Knowledge Engineering, vol. 66, No. 3, Sep. 2008, pp. 368-381.
Notice of Acceptance for Australian Patent Application No. 2014203669 dated Jan. 21, 2016.
Official Communication for New Zealand Patent Application No. 622389 dated Mar. 20, 2014.
Official Communication for New Zealand Patent Application No. 622404 dated Mar. 20, 2014.
Official Communication for New Zealand Patent Application No. 622473 dated Mar. 27, 2014.
Official Communication for New Zealand Patent Application No. 622439 dated Mar. 24, 2014.
European Search Report for European Patent Application No. 09813700.3 dated Apr. 3, 2014.
Extended European Search Report for European Patent Application No. 14158958.0 dated Jun. 3, 2014.
Official Communication for New Zealand Patent Application No. 622439 dated Jun. 6, 2014.
Extended European Search Report for European Patent Application No. 14158977.0 dated Jun. 10, 2014.
Official Communication for New Zealand Patent Application No. 622473 dated Jun. 19, 2014.
Official Communication for Great Britain Patent Application No. 1404499.4 dated Aug. 20, 2014.
Official Communication for New Zealand Patent Application No. 628161 dated Aug. 25, 2014.
Official Communication for Great Britain Patent Application No. 1404486.1 dated Aug. 27, 2014.
Official Communication for Great Britain Patent Application No. 1404489.5 dated Aug. 27, 2014.
Official Communication for Great Britain Patent Application No. 1411984.6 dated Dec. 22, 2014.
Official Communication for Australian Patent Application No. 2014201506 dated Feb. 27, 2015.
Official Communication for Australian Patent Application No. 2014201507 dated Feb. 27, 2015.
Official Communication for European Patent Application No. 14158977.0 dated Apr. 16, 2015.
Official Communication for European Patent Application No. 14158958.0 dated Apr. 16, 2015.
Official Communication for Netherlands Patent Application No. 2013134 dated Apr. 20, 2015.
Official Communication for Great Britain Patent Application No. 1404486.1 dated May 21, 2015.
Official Communication for Great Britain Patent Application No. 1404489.5 dated May 21, 2015.
Official Communication for Australian Patent Application No. 2014203669 dated May 29, 2015.
Official Communication for Great Britain Patent Application No. 1404499.4 dated Jun. 11, 2015.
Official Communication for Netherlands Patents Application No. 2012421 dated Sep. 18, 2015.
Official Communication for Netherlands Patents Application No. 2012417 dated Sep. 18, 2015.
Official Communication for Netherlands Patent Application No. 2012438 dated Sep. 21, 2015.
Official Communication for Great Britain Patent Application No. 1411984.6 dated Jan. 8, 2016.
Official Communication for European Patent Application No. 14158977.0 dated Mar. 11, 2016.
Official Communication for European Patent Application No. 14158958.0 dated Mar. 11, 2016.
Official Communication for European Patent Application No. 10188239.7 dated Mar. 24, 2016.
Official Communication for European Patent Application No. 15200073.3 dated Mar. 30, 2016.
Official Communication in New Zealand Application No. 627962 dated Aug. 5, 2014.
Official Communication for New Zealand Patent Application No. 140627NZ/BP dated May 5, 2014.
Official Communication for Canadian Patent Application No. 2,851,904 dated Apr. 21, 2017.
Official Communication for Israel Patent Application No. 198253 dated Nov. 24, 2014.
A.M. Bittlingmayer, How Good is a Round-trip Translation as a Machine Translation Quality Evaluation Technique?, Comment 16, dated Mar. 2014, Linguistics.stackexchange.com/questions/16994.
Palermo, Christopher J., "Memorandum," [Disclosure relating to U.S. Appl. No. 13/916,447, filed Jun. 12, 2013, and related applications], Jan. 31, 2014 in 3 pages.

(56) References Cited

OTHER PUBLICATIONS

Saito et al., "Optimistic Replication," Technical Report, Sep. 2003, 52 pages.
Official Communication for Australian Patent Application No. 2012238282 dated Jun. 6, 2014.
Official Communication for Australian Patent Application No. 2012238282 dated Jan. 30, 2014.
Official Communication for Canadian Patent Application No. 2,666,364 dated Oct. 3, 2013.
Official Communication for European Patent Application No. 13152370.6 dated Jun. 3, 2013.
Official Communication for European Patent Application No. 11807426.9 dated Nov. 15, 2016.
U.S. Appl. No. 13/922,437, filed Jun. 20, 2013, Office Action, dated Oct. 25, 2013.
U.S. Appl. No. 13/922,437, filed Jun. 20, 2013, Notice of Allowance, dated Jul. 3, 2014.
U.S. Appl. No. 13/922,437, filed Jun. 20, 2013, Notice of Allowance, dated May 8, 2014.
U.S. Appl. No. 14/304,741, filed Jun. 13, 2014, Notice of Allowance, dated Apr. 7, 2015.
U.S. Appl. No. 14/552,336, filed Nov. 24, 2014, Notice of Allowance, dated Nov. 3, 2015.
U.S. Appl. No. 12/556,307, filed Sep. 9, 2009, Office Action, dated Jun. 9, 2015.
U.S. Appl. No. 14/571,098, filed Dec. 15, 2014, First Office Action Interview, dated Mar. 11, 2015.
U.S. Appl. No. 14/552,336, filed Nov. 24, 2014, First Office Action Interview, dated Jul. 20, 2015.
U.S. Appl. No. 14/304,741, filed Jun. 13, 2014, Final Office Action, dated Mar. 3, 2015.
U.S. Appl. No. 14/304,741, filed Jun. 13, 2014, Office Action Pre Interview, dated Aug. 6, 2014.
U.S. Appl. No. 13/827,491, filed Mar. 14, 2013, Office Action, dated Dec. 1, 2014.
U.S. Appl. No. 13/827,491, filed Mar. 14, 2013, Final Office Action, dated Jun. 22, 2015.
U.S. Appl. No. 14/571,098, filed Dec. 15, 2014, First Office Action Interview, dated Aug. 5, 2015.
U.S. Appl. No. 14/571,098, filed Dec. 15, 2014, First Office Action Interview, dated Nov. 10, 2015.
U.S. Appl. No. 14/571,098, filed Dec. 15, 2014, First Office Action Interview, dated Aug. 24, 2015.
U.S. Appl. No. 13/827,491, filed Mar. 14, 2013, Office Action, dated Oct. 9, 2015.
U.S. Appl. No. 14/800,447, filed Jul. 15, 2012, First Office Action Interview, dated Dec. 10, 2010.
U.S. Appl. No. 12/556,307, filed Sep. 9, 2009, Notice of Allowance, dated Jan. 4, 2016.
U.S. Appl. No. 12/556,307, filed Sep. 9, 2009, Office Action, dated Sep. 2, 2011.
U.S. Appl. No. 12/556,307, filed Sep. 9, 2009, Final Office Action, dated Feb. 13, 2012.
U.S. Appl. No. 12/556,307, filed Sep. 9, 2009, Office Action, dated Oct. 1, 2013.
U.S. Appl. No. 12/556,307, filed Sep. 9, 2009, Final Office Action, dated Mar. 14, 2014.
U.S. Appl. No. 14/156,208, filed Jan. 15, 2014, Final Office Action, dated Aug. 11, 2015.
U.S. Appl. No. 14/156,208, filed Jan. 15, 2014, Interview Summary, dated Sep. 17, 2015.
U.S. Appl. No. 14/156,208, filed Jan. 15, 2014, Notice of Allowance, dated Feb. 12, 2016.
U.S. Appl. No. 12/556,307, filed Sep. 9, 2009, Notice of Allowance, dated Mar. 21, 2016.
U.S. Appl. No. 14/094,418, filed Dec. 2, 2013, Notice of Allowance, dated Jan. 25, 2016.
U.S. Appl. No. 14/156,208, filed Jan. 15, 2014, Office Action, dated Mar. 9, 2015.
U.S. Appl. No. 14/014,313, filed Aug. 29, 2013, First Office Action Interview, dated Jun. 18, 2015.
U.S. Appl. No. 14/014,313, filed Aug. 29, 2013, Final Office Action, dated Feb. 26, 2016.
U.S. Appl. No. 14/571,098, filed Dec. 15, 2014, Final Office Action, dated Feb. 23, 2016.
U.S. Appl. No. 14/800,447, filed Jul. 15, 2012, Interview Summary, dated Mar. 3, 2016.
U.S. Appl. No. 13/827,491, filed Mar. 14, 2013, Office Action, dated Mar. 30, 2016.
U.S. Appl. No. 14/526,066, filed Oct. 28, 2014, Office Action, dated Jan. 21, 2016.
U.S. Appl. No. 14/473,860, filed Aug. 29, 2014, Notice of Allowance, dated Jan. 5, 2015.
U.S. Appl. No. 14/518,757, filed Oct. 20, 2014, First Office Action Interview, dated Apr. 2, 2015.
U.S. Appl. No. 14/286,485, filed May 23, 2014, First Office Action Interview, dated Apr. 30, 2015.
U.S. Appl. No. 14/286,485, filed May 23, 2014, Pre-Interview Communication, dated Mar. 12, 2015.
U.S. Appl. No. 14/076,385, filed Nov. 11, 2013, Final Office Action, dated Jan. 22, 2015.
U.S. Appl. No. 14/537,367, filed Nov. 10, 2014, Office Action, dated Feb. 27, 2017.
U.S. Appl. No. 14/076,385, filed Nov. 11, 2013, Final Office Action, dated Jan. 25, 2016.
U.S. Appl. No. 14/518,757, filed Oct. 20, 2014, Office Action, dated Dec. 1, 2015.
U.S. Appl. No. 13/657,684, filed Oct. 22, 2012, Office Action, dated Aug. 25, 2014.
U.S. Appl. No. 14/334,232, filed Jul. 17, 2014, Notice of Allowance, dated Nov. 10, 2015.
U.S. Appl. No. 13/657,684, filed Oct. 22, 2012, Notice of Allowance, dated Mar. 2, 2015.
U.S. Appl. No. 14/518,757, filed Oct. 20, 2014, Final Office Action, dated Jul. 20, 2015.
U.S. Appl. No. 14/076,385, filed Nov. 11, 2013, Office Action, dated Jun. 2, 2015.
U.S. Appl. No. 14/334,232, filed Jul. 17, 2015, Office Action, dated Jul. 10, 2015.
U.S. Appl. No. 14/286,485, filed May 23, 2014, Notice of Allowance, dated Jul. 29, 2015.
U.S. Appl. No. 14/868,310, filed Sep. 28, 2015, Office Action, dated Dec. 16, 2016.
U.S. Appl. No. 13/076,804, filed Mar. 31, 2011, Final Office Action, dated Apr. 12, 2013.
U.S. Appl. No. 14/537,367, filed Nov. 10, 2014, Notice of Allowance, dated Jun. 5, 2017.
U.S. Appl. No. 13/076,804, filed Mar. 31, 2011, Office Action, dated Jan. 4, 2013.
U.S. Appl. No. 13/922,473, filed Jun. 20, 2013, Office Action, dated Oct. 25, 2013.
U.S. Appl. No. 13/922,473, filed Jun. 20, 2013, Notice of Allowance, dated Jul. 3, 2014.
U.S. Appl. No. 13/922,473, filed Jun. 20, 2013, Notice of Allowance, dated May 8, 2014.
U.S. Appl. No. 12/836,801, filed Jul. 15, 2010, Office Action, dated Sep. 6, 2012.
U.S. Appl. No. 12/836,801, filed Jul. 15, 2010, Notice of Allowance, dated Apr. 16, 2013.
U.S. Appl. No. 13/076,804, filed Mar. 31, 2011, Notice of Allowance, dated Aug. 26, 2013.
U.S. Appl. No. 13/686,750, filed Nov. 27, 2012, Office Action, dated Mar. 13, 2013.
U.S. Appl. No. 13/686,750, filed Nov. 27, 2012, Notice of Allowance, dated Jun. 6, 2013.
U.S. Appl. No. 14/842,770, filed Sep. 1, 2015, Office Action, dated Jun. 22, 2017.
U.S. Appl. No. 13/076,804, filed Mar. 31, 2011, Advisory Action, dated Jun. 20, 2013.
U.S. Appl. No. 14/830,420, filed Aug. 19, 2015, Office Action, dated Jan. 23, 2017.

(56) References Cited

OTHER PUBLICATIONS

U.S. Appl. No. 15/628,342, filed Jun. 20, 2017, Notice of Allowance, dated Jun. 4, 2018.
U.S. Appl. No. 15/628,342, filed Jun. 20, 2017, Pre Office Action Interview, dated Mar. 21, 2018.
U.S. Appl. No. 13/355,726, filed Jan. 23, 2012, Notice of Allowance, dated Apr. 28, 2014.
U.S. Appl. No. 14/830,420, filed Aug. 19, 2015, Office Action, dated Jul. 12, 2016.
U.S. Appl. No. 13/355,726, filed Jan. 23, 2012, Office Action, dated Mar. 25, 2014.
U.S. Appl. No. 13/076,804, filed Mar. 31, 2011, Notice of Allowance, dated Nov. 22, 2013.
U.S. Appl. No. 14/675,716, filed Mar. 31, 2015, Final Office Action, dated Dec. 24, 2015.
U.S. Appl. No. 15/143,780, filed May 2, 2016, Interview Summary, dated Aug. 30, 2017.
U.S. Appl. No. 15/143,780, filed May 2, 2016, Office Action, dated Jul. 17, 2017.
U.S. Appl. No. 15/143,780, filed May 2, 2016, Final Office Action, dated Oct. 10, 2017.
U.S. Appl. No. 15/143,780, filed May 2, 2016, Notice of Allowance, dated Apr. 2, 2018.
Hua, Yu, et al., "A Multi-attribute Data Structure with Parallel Bloom Filters for Network Services", In: Robert, Y., Parashar, M., Badrinath, R., Prasanna, V.K. (eds) High Performance Computing, —HiPC 2006, LNCS vol. 4297, pp. 277-288, Springer, Berlin, Heidelberg, https://doi.org/10.1007/11945918_30, 12pgs.
Notice of Allowance for Canadian Patent Application No. 2,851,904 dated Feb. 22, 2018.

* cited by examiner

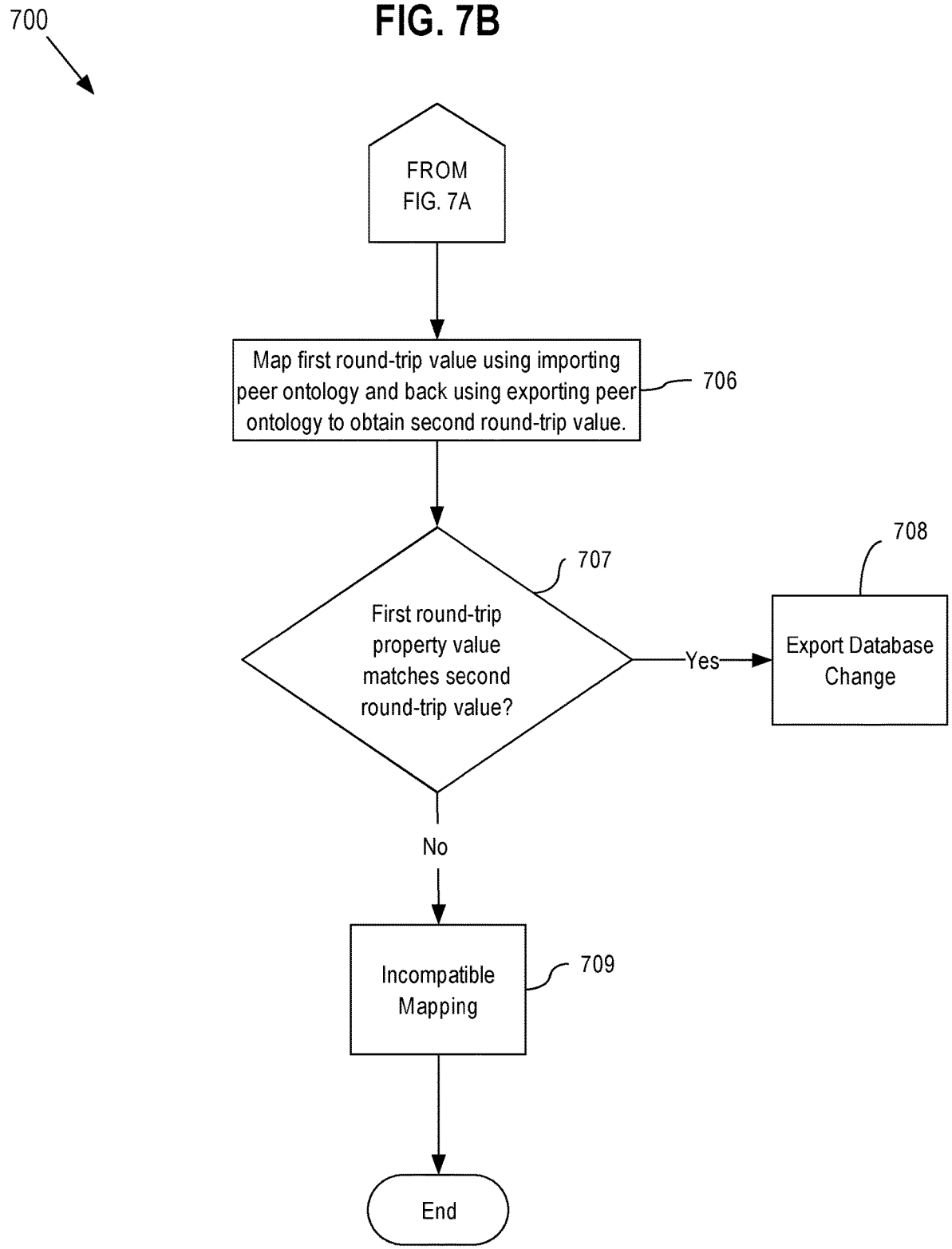

CROSS-ONTOLOGY MULTI-MASTER REPLICATION

CROSS-REFERENCE TO RELATED APPLICATIONS

This application claims the benefit as a Continuation of Divisional of patent application Ser. No. 15/143,780 filed May 2, 2016, which is a Divisional of patent application Ser. No. 14/156,208 filed Jan. 15, 2014 which is a Continuation of patent application Ser. No. 13/076,804, filed Mar. 31, 2011, the entire contents of which is hereby incorporated by reference as if fully set forth herein. Patent application Ser. No. 13/076,804 is related to the following commonly-owned, applications: application Ser. No. 12/836,801, filed Jul. 15, 2010, entitled "Sharing and Deconflicting Data Changes in a Multimaster Database System" and application Ser. No. 11/602,626, filed Nov. 20, 2006, entitled "Creating Data in a Data Store Using a Dynamic Ontology". The disclosure of each of the foregoing applications is hereby incorporated by reference in its entirety, for all purposes.

TECHNICAL FIELD

The present disclosure generally relates to distributed computing systems and, in particular, to cross-ontology data replication in a multi-master database system.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Multi-Master Database Systems

In a typical computer-based multi-master database system, data is stored in a group of databases, data changes may be made to any member of the group, and data changes made to one member are propagated to the rest of the group. Multi-master database systems typically employ either a "synchronous" or an "asynchronous" replication scheme for propagating a change made to one database to the rest of the databases in the group.

In typical synchronous multi-master replication, each change is applied to all databases in the group immediately or to none of the databases if one or more of the databases in the group cannot accept the change. For example, one of the databases may be offline or unavailable. Synchronous multi-master replication is typically achieved using a two-phase commit protocol.

In contrast, in typical asynchronous multi-master replication, a change made to a database is immediately accepted by the database but propagation of the change to other databases in the group may be deferred. Because propagation of changes may be deferred, if one or more of the databases in the group are unavailable, the available databases can still accept changes, queuing the changes locally until they can be propagated. For this reason, multi-master database systems employing an asynchronous replication strategy are generally considered to be more highly available than multi-master database systems employing a synchronous replication strategy. However, asynchronous replication often raises the possibility of conflicts that occur as a result of concurrent database changes. In some circumstances, resolution of these conflicts requires human intervention.

Database Ontologies in Multi-Master Database Systems

Each database system participating in a multi-master database system typically organizes data in the database it manages according to a fixed structure and a well-defined set of data types. For example, a relational database management system typically organizes data according to a fixed structure of tables and columnar data types. The structure and data type definitions may be described using an ontology, embodied in a database schema, comprising a data model that is used to represent the structure, define the data types, and reason about data objects in the structure.

All database systems participating in a multi-master database system normally adhere to the same ontology. The ontology at each database system is normally fixed at the time that the topology of the multi-master database system is established. Any change to an ontology used by one database system that causes the ontology to diverge from the ontologies used by the other database systems is typically extremely disruptive to the multi-master database system and requires a database administrator or a software programmer to create customized software to facilitate data replication between the database system using the diverging ontology and the other database systems in the multi-master database system.

The rigidity of the typical fixed ontology multi-master database system is a serious drawback for organizations that require flexible and dynamic data processing techniques according to changes in the data that is collected. For example, intelligence analysis is poorly suited to conventional fixed ontology multi-master database systems.

SUMMARY

A system and method providing cross-ontology multi-master replication is described. In a first embodiment a method for cross-ontology multi-master replication comprising the steps of: obtaining, at an importing site, an exporting site ontology and a set of one or more database changes; wherein the exporting site ontology defines a set of one or more data types; and after mapping the exporting site ontology to an importing site ontology, incorporating the set of one or more database changes into a database including mapping each of one or more data types of the set of data types to a data type defined by the importing site ontology using an ontology map.

In an aspect of the first embodiment, at least one database change of the set of one or more database changes comprises (a) a data item representing a change to a database copy at the exporting site and (b) data representing a data type of the data item according to the exporting site ontology.

In another aspect of the first embodiment, obtaining, at the importing site, the exporting site ontology and the set of one or more database changes comprises obtaining, at the importing site, a database update comprising the exporting site ontology and the set of one or more database changes.

In yet another aspect of the first embodiment, obtaining, at the importing site, a digest of an ontology map at the exporting site; computing a digest of an ontology map at the importing site; and comparing the obtained digest of the ontology map at the exporting site with the computed digest of the ontology map at the importing site.

In still yet another aspect of the first embodiment, at least one data type of the set of one or more data types is not defined by the importing site ontology.

In still yet another aspect of the first embodiment, the ontology map comprises a one-to-one mapping between a first particular data type defined by the exporting site ontology and a second particular data type defined by the importing site ontology; and wherein mapping each of the one or more data types of the set of data types to a data type defined by the importing site ontology using an ontology map comprises mapping the first particular data type to the second particular data type using the ontology map.

In still yet another aspect of the first embodiment, the ontology map comprises a one-to-many mapping between a first particular data type defined by the exporting site ontology and a plurality of data types defined by the importing site ontology; and wherein mapping each of the one or more data types of the set of data types to a data type defined by the importing site ontology using an ontology map comprises mapping the first particular data type to one of the plurality of data types defined by the importing site ontology using the ontology map.

In still yet another aspect of the first embodiment, the ontology map specifies a list of data types to be dropped when exporting database changes from the exporting site.

In still yet another aspect of the first embodiment, the ontology map comprises a one-to-one mapping between a first particular link data type defined by the exporting site ontology and a second particular link data type defined by the importing site ontology; wherein the mapping further specifies that a link represented by data of the first particular link data type should be reversed before data representing the link is incorporated into the database; and wherein incorporating the set of one or more database changes into the database comprises reversing a link represented by a particular database change of the set of database changes before incorporating the particular database change into the database.

In a second embodiment, a method for cross-ontology multi-master replication comprising the steps of: obtaining, at an exporting site, an importing site ontology; obtaining a database change comprising a property value, the property value having a exporting site property type as defined in an exporting site ontology; using an ontology map to map the exporting site property type to an importing site property type defined in the importing site ontology; transforming the property value to an intermediate property value based on the importing site property type; transforming the intermediate property value to a first round-trip value based on the exporting site property type; determining whether to export the database change to the importing site based on a comparison between the property value and the first round-trip value.

In an aspect of the second embodiment, determining to export the database change to the importing site in response to determining that the property value and the first round-trip value are the same.

In another aspect of the second embodiment, determining that the property value and the first round-trip value are different; transforming the first round-trip value to a second intermediate value based on the importing site property type; transforming the second intermediate value to a second round-trip value based on the exporting site property type; and determining whether to export the database change to the importing site based on a comparison between first round-trip value and the second round-trip value.

Other embodiments include, without limitation, a non-transitory computer-readable medium that includes processor-executable instructions that enable a processing unit to implement one or more aspects of the disclosed methods as well as a system configured to implement one or more aspects of the disclosed methods.

BRIEF DESCRIPTION OF DRAWINGS

The present invention is illustrated by way of example, and not by way of limitation, in the figures of the accompanying drawings and in which like reference numerals refer to similar elements and in which.

DETAILED DESCRIPTION

Introduction

Referring to the figures, example embodiments will now be described. The example embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware, or combinations thereof. For example, in an embodiment comprising a special-purpose computer, an apparatus element may comprise a functional block of circuit logic.

Further, in the following description, for the purposes of explanation, numerous specific details are set forth in order to provide a thorough understanding of the present invention. It will be apparent, however, that the present invention may be practiced without these specific details. In other instances, block diagrams include well-known structures and devices in order to avoid unnecessarily obscuring the present invention.

Multi-Master Database System with Ontology Mapping

Figure 1:
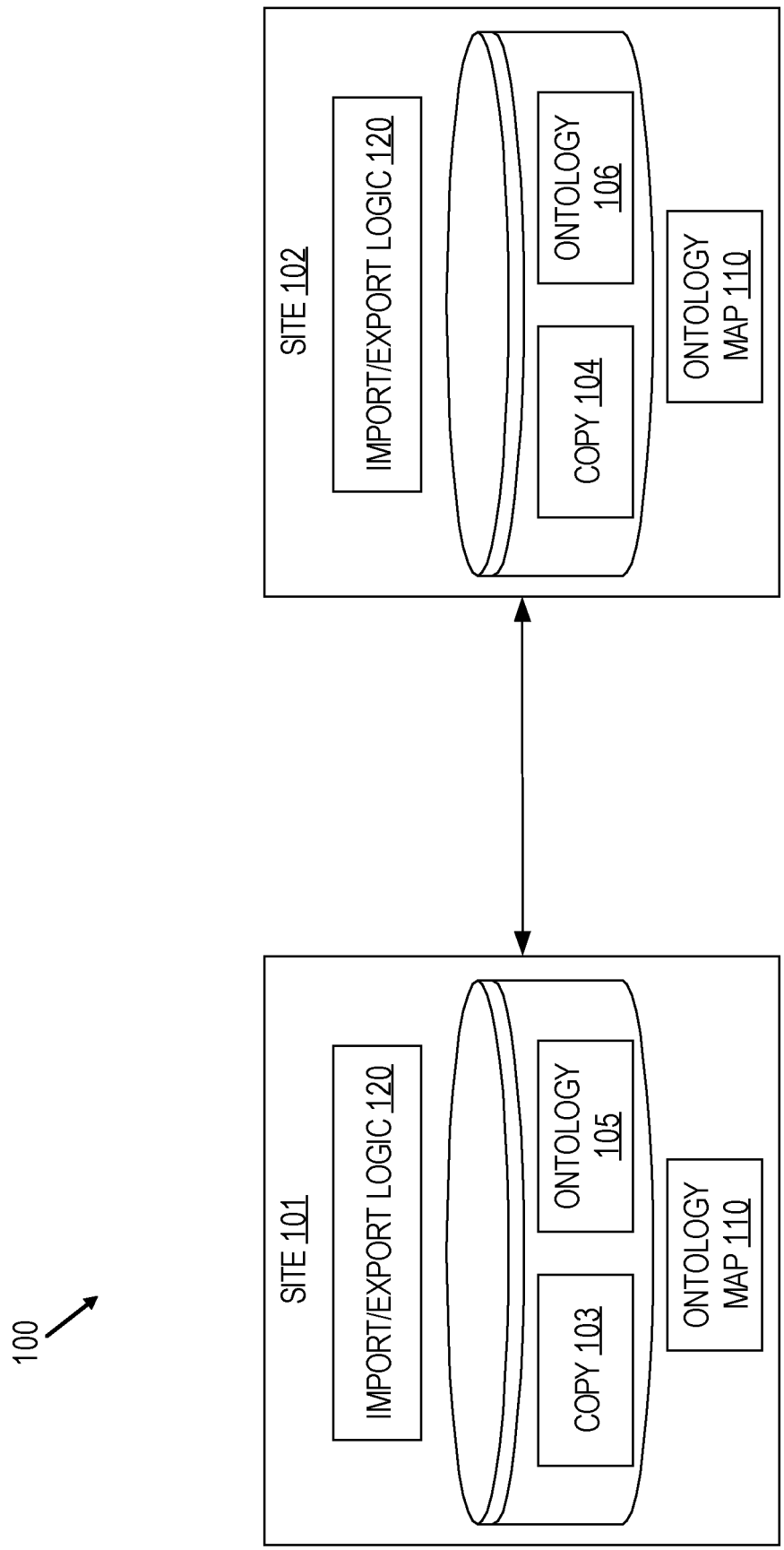
FIG. 1 illustrates a multi-master replication system.

FIG. 1 illustrates a multi-master database system 100 for use in cross-ontology multi-master replication between two replication sites 101 and 102. In one embodiment, sites 101 and 102 are coupled through one or more data networks such as the Internet, one or more wide area networks (WANs), one or more local area networks (LANs), one or more network communication buses, or some combination thereof. It is not necessary that a highly or continuously available data network exist between replication sites 101 and 102 and the data network(s) connecting any two sites may only be periodically available. In another embodiment, sites 101 and 102 are not connected to each other via a data network and data is transported between these sites manually using portable media or a portable media device as such as a Compact Disc (CD), a Digital Versatile Disc (DVD), Universal Serial Bus (USB) flash memory device, etc.

Each site 101 and 102 may comprise one or more computing devices such as one or more workstation computers, server computers, laptop computers, mobile computing devices, or combinations thereof connected to each other via one or more data networks. Further, while only two sites are shown in FIG. 1, multi-master database system 100 may comprise many hundreds or even many thousands of sites.

According to one embodiment, each site (101, 102) has a copy (103, 104) of a body of data. The body of data may be, for example, one or more tables in a relational database. However, embodiments are not limited to relational databases and any type of database capable of supporting the conceptual data model described herein may be used. Non-limiting examples of types of databases capable of supporting the conceptual data model described herein include relational databases, hierarchical databases, and object-oriented databases.

With respect to a particular body of data, site 101 may be configured to asynchronously propagate to site 102 changes made to database copy 103. Similarly, site 102 may be configured to asynchronously propagate to site 101 changes made to database copy 104. With regard to multi-master replication, sites 101 and 102 may be considered to be replication "peers" because they share database changes directly with each other without sharing changes through an intermediary site. It is not necessary that each site (101, 102, etc.) in the system 100 is configured to propagate to every other site changes made to its copy. In other words, a full-meshed multi-master site topology is not required to implement embodiments and partially-meshed or cascading multi-master topologies may be used.

As system 100 employs an asynchronous replication scheme, database copies in the system 100 are eventually consistent with each other. That is, each database copy may diverge from other copies from time to time such that at any given moment one database copy is inconsistent with another database copy. Two database copies are inconsistent when one database copy has incorporated a change and the other database copy has not yet been notified of the change. In the absence of new changes to either database copy, the database copies are expected to eventually become consistent with one another. Note that consistent database copies do not necessarily mean identical database copies. Indeed, since two database copies might use different ontologies, it is expected that two database copies can be consistent but not identical. For example, both database copies 103 and 104 might separately contain a data object representing the same real world entity such as, for example, the same person; however, under the ontology 105 of database copy 103 the data object may have the data type "Person" while under the ontology 106 of database copy 104 the data object may have the data type "Human".

Each site in the system 100 has import/export logic 120 that includes a cross-ontology multi-master replication feature. In an embodiment, the cross-ontology multi-master replication feature can function to map data types defined by a peer site's ontology (e.g., ontology 106) to data types defined by the local site's ontology (e.g., ontology 105) where the two peer ontologies do not define identical data types (i.e., where the two peer ontologies differ) using an ontology map 110. In an embodiment, the ontology map 110 fills the gaps between the two peer ontologies 105 and 106 such that sites 101 and 102 are still able to share database changes with each other despite using different ontologies. Specific techniques for cross-ontology multi-master replication using an ontology map are described in greater detail below.

The import/export logic 120 may be implemented as one or more computer software programs, one or more field programmable logics, hard-wired logic, or a combination thereof. In one embodiment, import/export logic 120 is a software component of a database management system such as an open source database system such as Cassandra, or those commercially available from the Oracle Corporation of Redwood Shores, Calif. and the Microsoft Corporation of Redmond, Wash. In another embodiment, import/export logic 120 is software component of a web-based, server-based or desktop application that uses a database management system for performing the cross-ontology multi-master replication techniques described herein. In yet another embodiment, import/export logic 120 is implemented in part by a web-based, server-based or desktop application and in part by a database management system.

As used herein, the term "database change", unless otherwise apparent from the surrounding text, refers to an addition, edit, or deletion to the body of data stored in a database copy (e.g., copy 103) at a site. A database change can be made at the site by a user or a computing process. In addition, a database change can also be made by import/export logic 120 in response to receiving notification of a database change made to a database copy at a peer site.

As used herein, the term "database update", unless otherwise apparent from the surrounding text, refers to information about a database change that is sent (exported) from the site that made the change to a peer site. Each database change to a database copy at a site may result in a database update being received at every other site in the multi-master topology so that the other sites can incorporate the change into their respective database copies. The site sending a database update is referred to herein as the "exporting" peer and the site incorporating the sent database update is referred to herein as the "importing" peer. For example, if site 101 sends a database update to site 102, then site 101 is the exporting peer and site 102 is the importing peer.

In one embodiment, a database update is sent from the exporting peer according to the exporting site's ontology. When the database update is received at the importing peer, the importing peer maps any of the exporting peer's data types that are not defined by the importing peer's ontology using an ontology map configured at the importing peer. After this cross-ontology data-type mapping is complete, the importing peer incorporates the database update into its database copy, mapping data types between the exporting peer's ontology and the importing peer's ontology using the ontology map as necessary. Notably, the data of the database update as incorporated into the incorporating peer's database copy is data typed according to the importing peer's ontology even though the data as exported by the exporting peer was data typed according to the exporting peer's ontology.

Example Database Data Model and Example Database System Using an Ontology to Make Database Changes To provide a framework for the following discussion of specific techniques for cross-ontology multi-master replication, an example database data model and an example database system using an ontology to make database changes to the system's database copy will now be described. This description is provided for the purpose of providing a clear example and is not intended to limit the techniques to the example data model, the example database system, or the example database system's use of an ontology to make database changes.

Example Object-Centric Data Model

In one embodiment, a body of data, of which each site (101, 102, etc.) maintains a copy (103, 104, etc.), is conceptually structured according to an object-centric data model. The conceptual data model is independent of any particular database data model that may be used for durably storing a database copy at a site. For example, each object of the conceptual data model may correspond to one or more rows in a relational database or an entry in Lightweight Directory Access Protocol (LDAP) database.

Figure 2:
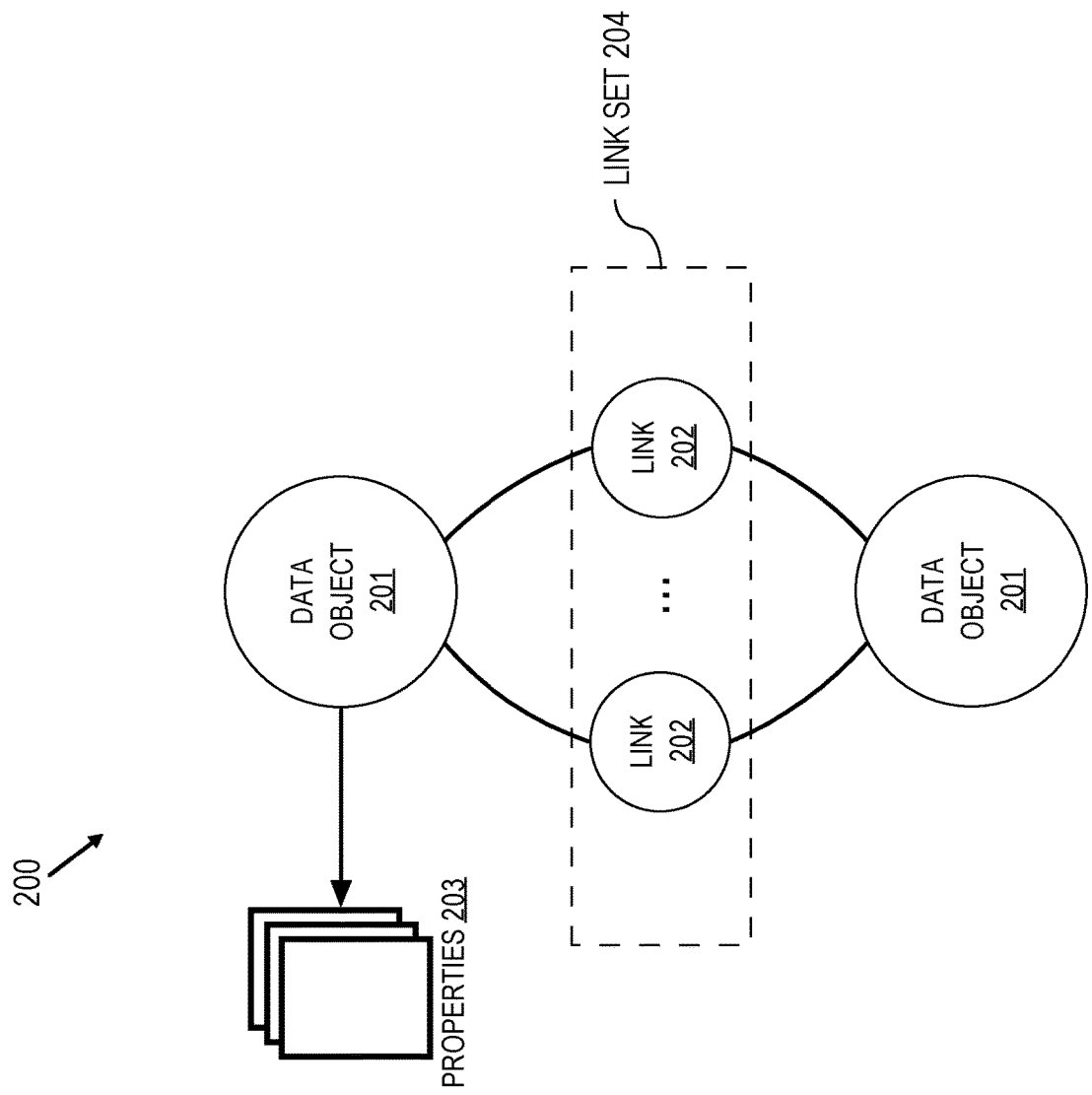
FIG. 2 illustrates an object-centric conceptual data model.

FIG. 2 illustrates an object-centric conceptual data model 200 according to an embodiment. Model 200 is centered on a data object 201. At the highest level of abstraction, data object 201 is a container for information representing things in the world. For example, data object 201 can represent an entity such as a person, a place, an organization, or other noun. Data object 201 can represent an event that happens at a point in time or for a duration. Data object 201 can represent a document or other unstructured data source such as an e-mail message, a news report, or a written paper or article. Each data object 201 is associated with a unique identifier that uniquely identifies the data object within system 100.

Each data object 201 as represented by data in a database copy (103, 104, etc.) at a site (101, 102, etc.) may have an object type (e.g., Person, Event, or Document) defined by the database ontology (105, 106, etc.) used by the database copy (103, 104, etc.). The same data object represented in two different database copies (e.g., 103, 104) may have two different object types as separately defined by the two different database ontologies (e.g., 105, 106). For example, the same data object in one database copy (e.g., 103) may be defined as a "Business" object type while defined in another database copy (e.g., 104) as an "Organization" object type. Further, when hierarchical object types are supported, two ontologies may separately define super-object types and sub-object types of the super-object types. For example, one ontology may define a "Person" super-object type an additionally define an "Employee" sub-object type of the "Person" super-object type. On the other hand, the other ontology may define only the "Person" object type but not define the "Employee" object type. In this case, the same data object in one database copy may be defined as object type "Employee" while defined in the other database copy as object type "Person".

Each data object 201 may have one or more properties 203. Properties 203 are attributes of the data object 201 that represent individual data items. At a minimum, each property 203 of a data object 201 has a property type and a value. Different types of data objects may have different property types. For example, a "Person" data object might have an "Eye Color" property type and an "Event" data object might have a "Date" property type.

Each property 203 as represented by data in a database copy (e.g., 104) at a site (e.g., 102) may have a property type defined by the database ontology (e.g., 106) used by the database copy. The same property represented in two different database copies may have two different property types as separately defined by the two different database ontologies. For example, the same property in one database copy may be defined by that copy's ontology as a "Phone Number" property type in which the value of the property is treated as a string data type while defined by the other ontology also as a "Phone Number" property type but where the value of the property is treated as a numerical data type.

In addition, data model 200 may support property multiplicity. In particular, a data object 201 may be allowed to have more than one property 203 of the same property type. For example, a "Person" data object might have multiple "Address" properties or multiple "Name" properties.

Each link 202 represents a connection between two data objects 201. In one embodiment, the connection is either through a relationship, an event, or through matching properties. A relationship connection may be asymmetrical or symmetrical. For example, "Person" data object A may be connected to "Person" data object B by a "Child Of" relationship (where "Person" data object B has an asymmetric "Parent Of" relationship to "Person" data object A), a "Kin Of" symmetric relationship to "Person" data object C, and an asymmetric "Member Of" relationship to "Organization" data object X. The type of relationship between two data objects may vary depending on the types of the data objects. For example, "Person" data object A may have an "Appears In" relationship with "Document" data object Y or have a "Participate In" relationship with "Event" data object E. As an example of an event connection, two "Person" data objects may be connected by an "Airline Flight" data object representing a particular airline flight if they traveled together on that flight, or by a "Meeting" data object representing a particular meeting if they both attended that meeting. In one embodiment, when two data objects are connected by an event, they are also connected by relationships, in which each object has a specific relationship to the event, such as, for example, an "Appears In" relationship. As an example of a matching properties connection, two "Person" data objects representing a brother and a sister, may both have an "Address" property that indicates where they live. If the brother and the sister live in the same home, then their "Address" properties likely contain similar, if not identical information. In one embodiment, a link between two data objects may be established based on similar or matching properties of the data objects. These are just some examples of the types of connections that may be represented by a link and other types of connections may be represented; embodiments are not limited to any particular types of connections between data objects. For example, a document might contain two different tagged entities. A link between two data objects may represent a connection between these two entities through their co-occurrence within the same document.

Each data object 201 can have multiple links with another data object 201 to form a link set 204. For example, two "Person" data objects representing a husband and a wife could be linked through a "Spouse Of" relationship, a matching property ("Address"), and an event ("Wedding").

Each link 202 as represented by data in a database copy (e.g., 104) at a site (e.g., 102) may have a link type defined by the database ontology (e.g., 106) used by the database copy. The same link represented in two different database copies may have two different property types as separately defined by the two different database ontologies. For example, the same link in one database copy may be defined by that copy's ontology as a "Related To" link type while defined by the other ontology as a "Parent Of" link type. Further, two ontologies may separately define opposite asymmetric link types. For example, one ontology may define a "Parent Of" link type but not define a "Child Of" link type while the other ontology may define a "Child Of" link type but not define a "Parent Of" link type. In this case, the directions of links linking the same two data objects may be different in different database copies. For example, in one database copy, a "Parent Of" link may "point" from data object A to data object B while in another database copy a "Child Of" link may "point" from data object B to data object A.

Figure 3:
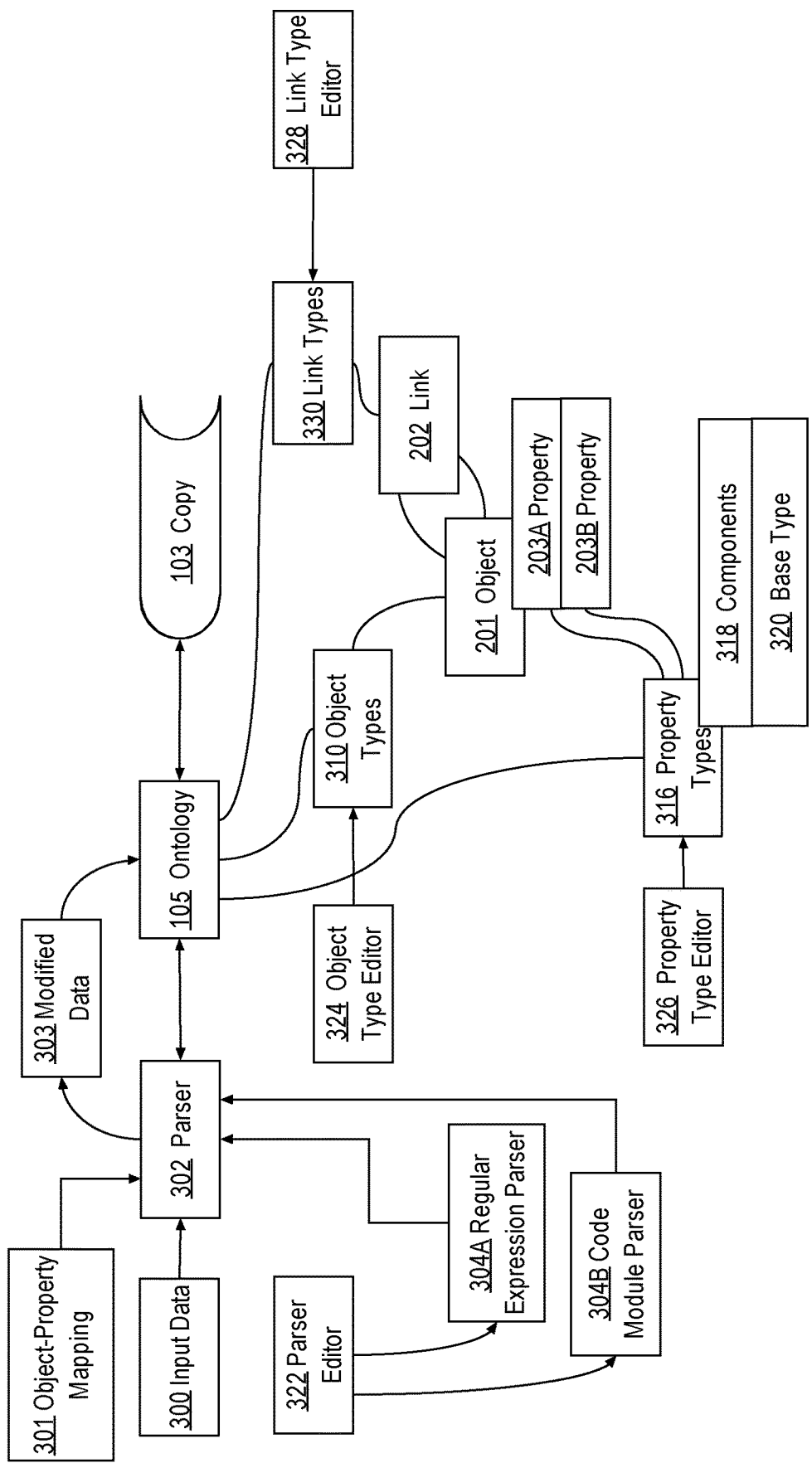
FIG. 3 illustrates a system for creating data in a database copy using an ontology.

Example Database System Using an Ontology to Make Database Changes to the System's Database Copy FIG. 3 illustrates example components of a database system at a site for creating data in a database copy (i.e., making database changes to the copy) at the site using the database copy's ontology. In the example depicted in FIG. 3, the components are of the database system at site 101 of multi-master replication system 100. Similar components may be part of the database system at site 102 and at other sites of the system 100. The ontology 105 at site 101 may be different than the ontology 106 at site 102; thus one or more of object types 310, property types 316, and link types 330 may be defined in one ontology (e.g., 105) that are not defined in the other ontology (e.g., 106), and the converse also could be implemented.

In an embodiment, a parser 302 is coupled to the ontology 105, which is coupled to the database copy 103. In an embodiment, ontology 105 comprises stored information providing the data model 200 of data stored in database copy 103, and the ontology is defined by one or more object types 310, one or more property types 316, and one or more link types 330. One or more data objects 201 in the database copy 103 may be instantiated based on the object types 310, and each of the objects 201 has one or more properties 203 that are instantiated based on property types 316. Two data objects 201 may be connected by one or more links 202 that may be instantiated based on link types 330. The property types 316 each may comprise one or more components 318, such as a string, number, etc. Property types 316 may be instantiated based on a base property type 320. For example, a base property type 320 may be "Locations" and a property type 316 may be "Home."

In an embodiment, a user of the system uses an object type editor 324 to create the object types 310 and define attributes of the object types. In an embodiment, a user of the system uses a property type editor 326 to create the property types 316 and define attributes of the property types. In an embodiment, a user of the system uses link type editor 328 to create the link types 330. Alternatively, other programs, processes, or programmatic controls may be used to create link types and property types and define attributes, and using editors is not required.

In an embodiment, creating a property type 316 using the property type editor 326 involves defining at least one parser definition using a parser editor 322. A parser definition comprises metadata that informs parser 302 how to parse input data 300 to determine whether values in the input data can be assigned to the property type 316 that is associated with the parser definition. In an embodiment, each parser definition may comprise a regular expression parser 304A or a code module parser 304B. In other embodiments, other kinds of parser definitions may be provided using scripts or other programmatic elements. The elements of a regular expression parser 304A and a code module parser 304B are described further in subsequent sections. Once defined, both a regular expression parser 304A and a code module parser 304B can provide input to parser 302 to control parsing of input data 300.

In one embodiment of using the system of FIG. 3, input data 300 is provided to parser 302. An object-property mapping for the input data 300 enables the parser to determine which object type 310 should receive data from a record of the input data, and which property types 316 should receive data from individual field values in the input data. Based on the object-property mapping 301, the parser 302 selects one of the parser definitions that is associated with a property type in the input data. The parser parses an input data field using the selected parser definition, resulting in creating modified data 303. The modified data 303 is added to the database copy 103 according to ontology 105 by storing values of the modified data in a property of the specified property type. As a result, input data 300 having varying format or syntax can be created in database copy 103. The ontology 105 may be modified at any time using object type editor 324, property type editor 326, and link type editor 328, or under program control without human use of an editor. Parser editor 322 enables creating multiple parser definitions that can successfully parse input data 300 having varying format or syntax and determine which property types should be used to transform input data 300 into modified input data 303.

Cross-Ontology Exporting and Importing of Database Changes

Figure 4:
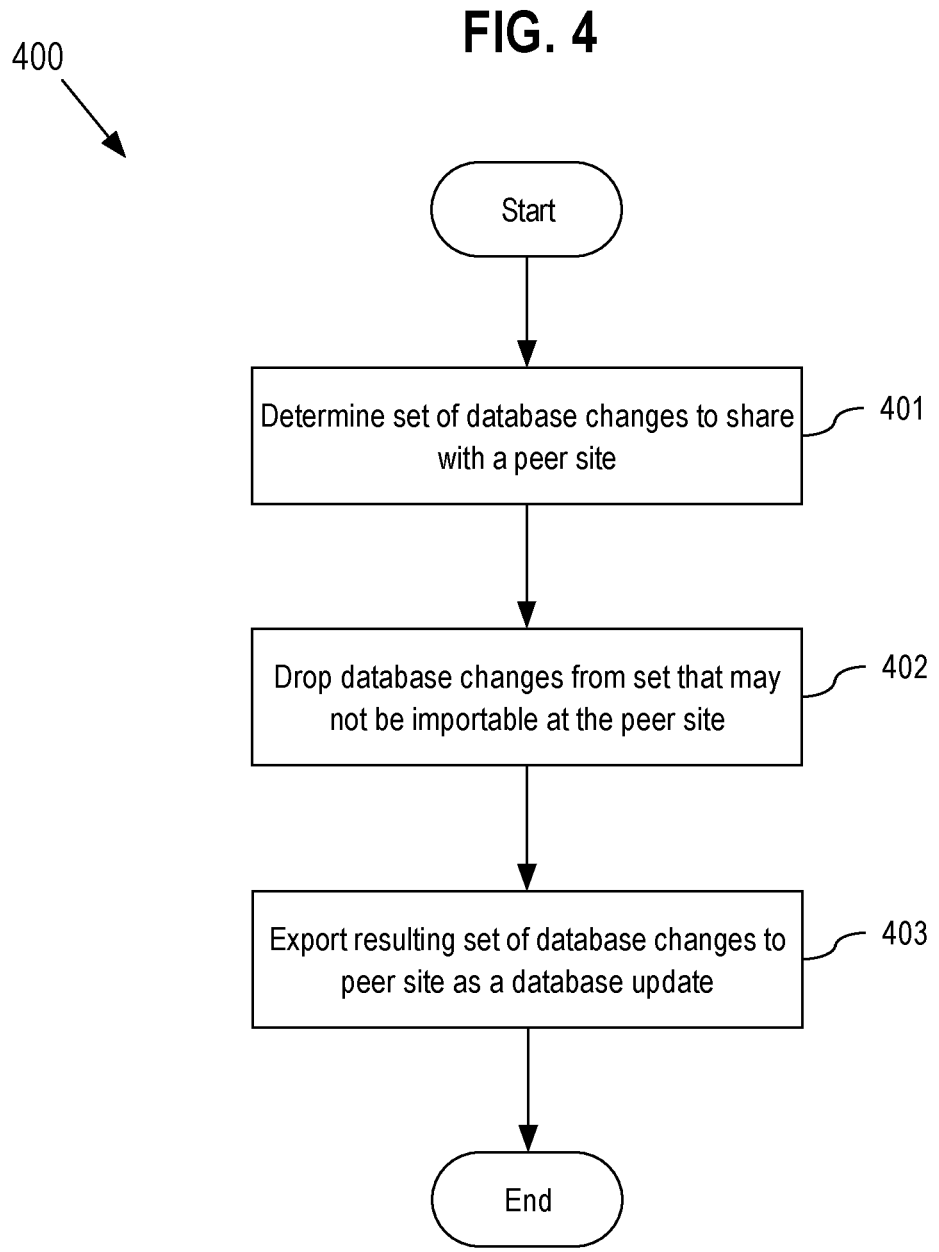
FIG. 4 illustrates exporting database changes using an ontology map.
Figure 5:
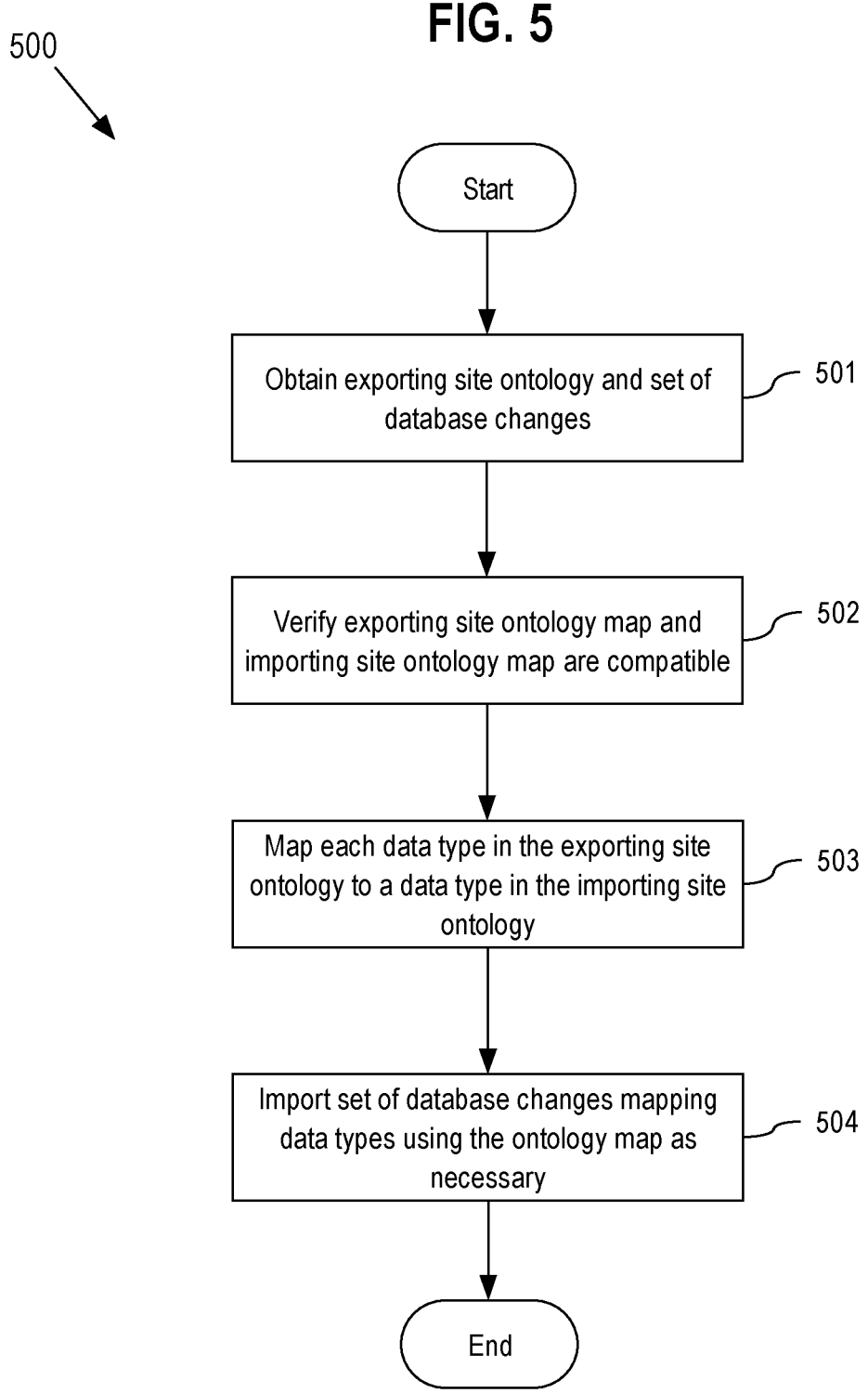
FIG. 5 illustrates importing database changes using an ontology map.

FIG. 4 illustrates steps of a method 400 for exporting database changes from one database copy at one site in a multi-master replication topology to a peer site in the multi-master replication topology. FIG. 5 illustrates steps of a method 500 for importing the database changes at the peer site. For the purpose of providing a clear example, reference will be made to the multi-master system 100 of FIG. 1 in which site 101 is considered to be the exporting peer and site 102 is considered to be the importing peer. Alternatively, site 102 could be the exporting peer and site 101 the importing peer.

Ontology 105 of the exporting peer 101 may be different than the ontology 106 of the importing peer 102. That is, the ontology 105 of the exporting peer 101 may define one or more data types that are not defined by the ontology 106 of the importing peer 106 and the ontology 106 of the importing peer 102 may define one or more data types that are not defined by the ontology 105 of the exporting peer 101. In this context, the exporting peer 101 may wish to share database changes it made to its database copy 103 with the importing peer 102 and the importing peer 102 may wish to incorporate the shared database changes into its database copy 104 even though the peers use different ontologies.

In one embodiment, to accomplish cross-ontology sharing of database changes, both the exporting peer 101 and the importing peer 102 are configured with the semantically same ontology map 110. In one aspect, the ontology map 110 declares rules for mapping data types defined in one site's ontology to data types defined in another site's ontology and vice versa to facilitate sharing of data between the sites yet at the same time facilitating maintenance and development of separate ontologies at the sites. Separate and differing ontologies at the sites may be desirous, for example, if the sites are controlled by different entities such as different companies or different organizations or different divisions within an organization. With the ontology map, two sites that wish to share data with each other do not need to agree on a common ontology. They need only agree on how to map data types between the ontologies. As a result, if one site changes the type of an object, link, or property to one that it is not known to the peer site's ontology, the type change can still be shared with the peer site so long as the ontology map provides a rule for mapping the type to one that is known to the peer site's ontology.

In one embodiment, the data format of the ontology map 110 and the cross-ontology data type mapping rules contained therein is based on the eXtensible Markup Language (XML). Specific examples of mapping rules are provided below. The examples are provided in XML format. However, it will be apparent to one skilled in the art that other data formats for expressing the ontology map 110 in a form understandable by a computer are possible and that the invention is not limited to only XML-based formats. In one embodiment, the ontology map 110 is created by a database administrator by using, for example, a text editor or computer application configured to generate ontology maps according to a user's commands.

Exporting

Referring now to FIG. 4, in one embodiment, process 400 is performed by the import/export logic 120 of the exporting peer 101 after the exporting peer 101 has been configured with the ontology map 110. At step 401, the exporting peer 101 determines a set of database changes made to the exporting peer's database copy 103 to share with the importing peer 102. The specifics of how the exporting peer 101 determines the set of database changes to be shared are beyond the scope of this disclosure and not essential to the invention disclosed herein. In general, it is expected, but not required, that the set of database changes will include data representing changes made to the body of data in the exporting peer's database copy 103 that are not yet known to the importing peer 102. Any number of a variety of techniques for tracking the ordering of events in a distributed system may be used to determine whether the importing peer already knows about changes made to the exporting peer's copy 103 including, for example, use of vector clocks. Significantly, the set of database changes to be shared by the exporting peer 101 is data typed according to the exporting peer's ontology 105. For example, the set of database changes may include data representing one or more data objects 201, properties 203, and links 202 typed according object types 310, property types 316, and link types 330 defined in the exporting peer's ontology 105.

At step 402, one or more database changes in the set of database changes to be shared that may not be importable at the importing site 102 are dropped from the set by the exporting peer 101 before the set is shared with the importing peer 102. A database change may not be importable at the importing peer 102 if the database change has a data type according to the exporting peer's ontology 105 that is not defined by the importing peer's ontology 106 and for which the ontology map 110 does not provide a rule for mapping that data type to a data type in the importing peer's 106 ontology. For example, an administrator at the exporting peer 101 may define a new data type in the ontology 105 for which the administrator has yet to decide how the new data type should be mapped to the importing peer's ontology 106.

In one embodiment, the ontology map 110 specifies the list of data types to be dropped by the exporting peer 101 when exporting a set of database changes. This list can be added to or amended as needed by an administrator at the exporting peer 101. Before the import/export logic 120 of the exporting peer 101 shares a set of database changes with the importing peer 102, the logic 120 removes all database changes from the set that have a data type on the list of data types to be dropped. As a result, sharing of database changes for which no corresponding data type is defined in the importing peer's ontology 106 is prevented. This prevents errors and failures at the importing peer when importing the set of database changes. Further, this allows the ontology 105 of the exporting peer 101 to be extended (i.e., new types added) before it has been determined how the new types will map to data types in the ontology 106 of the importing peer 102. Meanwhile, sharing of database changes between the peers with respect to other data types can continue.

In accordance with an embodiment, the list of data types to be dropped by the exporting peer 101 when exporting a set of database changes is specified in the ontology map 110 using the following XML syntax:

```
<droppedUri>
  <systemId>SYSTEM_ID</systemId>
```

-continued

```
  <uri>URI1</uri>
</droppedUri>
<droppedUri>
  <systemId>SYSTEM_ID</systemId>
  <uri>URI2</uri>
</droppedUri>
...
<droppedUri>
  <systemId>SYSTEM_ID</systemId>
  <uri>URIN</uri>
</droppedUri>
```

The <droppedUri> element contains a data type to drop on export. The <systemId> element contains a value SYSTEM_ID that identifies the site that is to drop the listed data type when exporting. An ontology map 110 can specify multiple drop data types lists for multiple sites. For example, ontology map 110 may specify a drop data types list for site 101 and another drop data types list for site 102. Each site separately consults its list in the map 110 when exporting a set of database changes. Each data type to be dropped is identified as a value of a <uri> element. In one embodiment, the value of a <uri> element is a Uniform Resource Indicator (URI) that uniquely identifies the data type within the exporting site's ontology. Dropped types can include object types, property types, and link types, for example.

Figure 6:
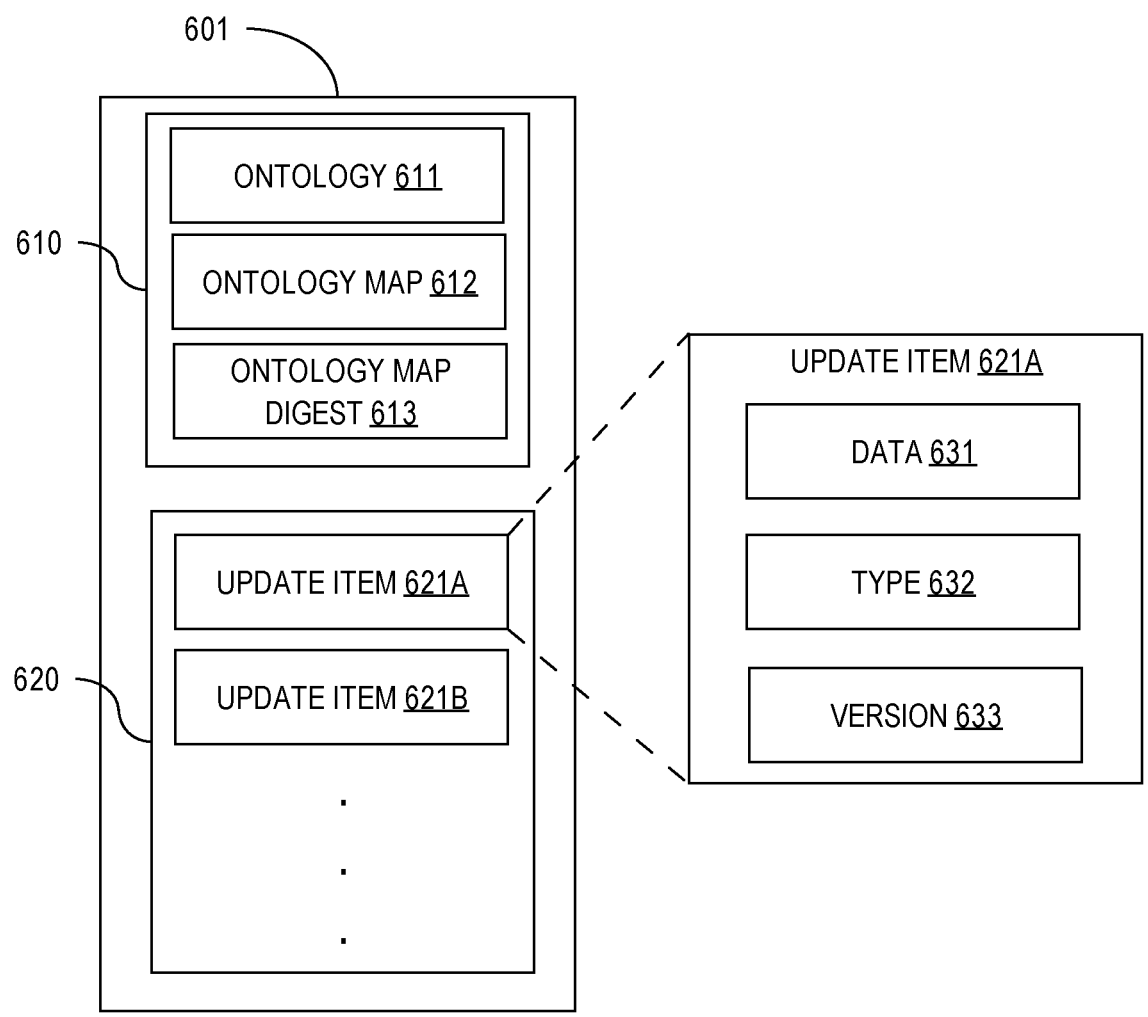
FIG. 6 illustrates a database update.

At step 403, the set of database changes minus the database changes dropped in step 402 are sent from the exporting site 101 as a database update to the importing site 102. FIG. 6 is a block diagram and schematic illustration of a database update 601 sent from the exporting site 101 to the importing site 102 according to an embodiment. In one embodiment, database update 601 is XML formatted and sent between exporting site 101 and importing site 102 over a data network as one or more network data packets.

In accordance with one embodiment, database update 601 comprises a set of database changes 620 and database update metadata 610. In one embodiment, the database update metadata 610 includes an ontology 611, an ontology map 612, and a digest 613 of the ontology map 612. The ontology 611 includes the ontology 105 of the exporting peer 101 or a portion thereof. The ontology map 612 includes the ontology map 110 as configured at the exporting peer 101. In one embodiment, the update 601 includes one or the other of the ontology map 612 and the digest 613 but not both.

The set of database changes 620 includes one or more update items 621A, 621B, etc. Each update item 621 includes data 631 representing a database change to the exporting site's database copy 103, type information 632 specifying the data type of data 631 according to the exporting site's ontology 105, and version information 633 indicating the version of data 631 in the exporting site's database copy 103. For example, data 631 may represent a database change to a data object 201, a property 203, or a link 202; type information 632 may specify a object type 310, a property type 316, or a link type 330; and the version information 633 may be, for example, a vector clock representing the version of the data object 201, the property 203, or the link 202 in the exporting peer's database copy 103.

In one embodiment, as described in greater detail below with respect to FIG. 5, the database update metadata 610 is used by the import/export logic 120 of the importing peer 102 when importing the set of database changes 620 into the importing peer's database copy 104. Briefly, the importing peer 102, before importing any of the database changes 620 into its database copy 104, verifies that every data type in the exporting peer's ontology 611 as sent in the update 601 has a corresponding data type in the importing peer's ontology 106. This verification includes, in one embodiment, the importing peer 102 computing a digest of its copy of the ontology map 110 and comparing the computed digest to the digest 613 in the update metadata 610 to verify that the exporting peer 101 and the importing peer 102 are configured with compatible ontology maps. Once the ontology maps 110 at peers 101 and 102 are verified to be compatible, the importing peer 101 attempts to map every data type defined in the exporting peer's ontology 611 to a type defined in the importing peer's ontology 106. If there is no direct mapping available for a type defined in the ontology 611 (i.e., the type is defined by the exporting peer's ontology 611 but not defined the importing peer's ontology 106), then the importing peer 102 attempts to map the type using a rule or rules in the ontology map 110. Assuming each and every type in the exporting peer's ontology 611 can be successfully mapped to a type in the importing peer's ontology 106, the importing peer 102 proceeds to import the database changes 620 in the update 601 into the importing peer's database copy 104, mapping data types 632 using the ontology map 110 as necessary.

In some embodiments, in the context of configuring the exporting peer 101 with a new ontology map that is semantically different than the ontology map that the exporting peer 101 is concurrently configured with, the import/export logic 120 performs a validation process with respect to the new ontology map and the current ontology map. This process involves identifying mapping differences between the current ontology map and the new ontology map and notifying a user of potential inconsistencies that could result from the mapping differences. The mapping differences of concern of those in which the new ontology map changes a mapping for data that may have already been exported or imported under the current ontology map. In this case, when an administrator configures the exporting peer 101 with the new ontology map, the administrator is notified about data that may have been exported or imported under the current ontology map having a data type that is now inconsistent with the new ontology map.

For example, suppose the current ontology map used by two peers has a mapping in which object type A is mapped to object type B (A→B) and object type C is mapped to object type D (C→D). Under this mapping, when an object of type A is exported from a first of the two peers to a second of the two peers, object type A is mapped to object type B at the second peer. And when an object of object type B is exported from the second peer to the first peer, object type B is mapped to object type A at the first peer. Similarly, under this mapping when an object of type C is exported from the first peer to the second peer, object type C is mapped to object type D at the second peer. And when an object of object type D is exported from the second peer to the first peer, object type D is mapped to object type C at the first peer.

Continuing the example, now assume an administrator wishes to replace the current ontology map at the two peers with a new ontology map in which object type A is mapped to object type D (A→D) and object type C is mapped to object type B (C→B). The administrator may wish to do this, for example, after realizing that the current ontology map incorrectly mapped A to B and C to D. Under this new mapping, when an object of type A is exported from the first peer to the second peer, object type A is mapped to object type D at the second peer. And when an object of object type D is exported from the second peer to the first peer, object type D is mapped to object type A at the first peer. Similarly, for object types C and B. If database changes had been exported and imported between the two peers under the current ontology map, then there may be objects of type A in the first peer's database that should of type C under the new ontology map and there may be objects of type B in the second peer's database that should be of type D under the new ontology map. In this case, in the context of an administrator configuring the first peer with the new ontology map, the import/export logic 102 at the first peer detects that object type A is remapped from B to D and object type C is remapped from D to B and notifies the administrator through a screen or console message of the potential data type inconsistencies that may exist for objects of type A in the first peer's database and objects of type B in the second peer's database.

Importing

Referring now to FIG. 5, in one embodiment, process 500 is performed by the import/export logic 120 of the importing peer 102. At step 501, the importing peer 102 obtains the exporting peer ontology 611 and a set of database changes 620. For example, the importing peer 102 may obtain the exporting peer ontology 611 and the set of database changes 620 in a database update 601 sent from the exporting peer. In one embodiment, the importing peer 102 obtains the exporting peer ontology 611 and the set of database changes 620 in a plurality of database updates 601. For example, the exporting peer ontology 611 may be sent by the exporting peer in an initial database update 601 and the set of database changes 620 sent in a subsequent database update 601. Thus, it is not requirement that every database update 601 include both the exporting peer ontology 611 along with a set of database changes 620 and some database updates 601 may include one but not the other.

The portion of the exporting peer ontology 611 sent in an update 601 may or may not comprise the entire ontology 105 used by the exporting peer. In one embodiment, the exporting peer ontology 611 comprises at least the data types 632 involved in an associated set of database changes 620.

At step 502, the importing peer 102 verifies that the ontology map 110 at the exporting peer 101 is compatible with the ontology map 110 at the importing peer 102. In one embodiment, this verification involves the import/export logic 120 of the importing peer 102 computing a digest of the ontology map 110 at the importing peer 102 to compare with the digest 613 in the database update 601 containing the set of database changes 620. In one embodiment, if the digests match, then the importing peer 102 concludes that the ontology maps 110 at the exporting peer 101 and the importing peer 102 are compatible. If the digests do not match, then, in one embodiment, the importing peer 102 assumes that the exporting peer 101 and the importing peer 102 are configured with incompatible ontology maps 110. Accordingly, the importing peer 102 in this case may not import the set of database changes 620 into the importing peer's database copy 104. In one embodiment, the digest computed by the importing peer 102 and the digest 613 computed by the exporting peer are computed using a collision resistant cryptographic hash function (e.g., MD5). The ontology map may be normalized prior to being provided to the hash function so that trivial differences between ontology maps do not produce differing digests.

In an embodiment in which the exporting peer's ontology map 110 is sent in the update 601 in lieu of a digest 613, the importing peer 102 compares the exporting peer's ontology map 110 with its copy of the ontology map 110 to determine if the two copies are compatible. Such comparison may involve a byte level comparison or comparisons at a semantically higher-level.

At step 503, the importing peer 102 attempts to map each and every type defined in the exporting peer's ontology 611 sent in the update 601 to a data type defined in the importing peer's ontology 106. In one embodiment, the importing peer 102 performs this mapping before importing the set of database changes 120 into the importing peer's database copy 104. By successfully mapping each and every type defined in the exporting peer's ontology 611 sent in the update 601 to a data type defined in the importing peer's ontology 106, the importing peer 102 can import the set of database changes 620 with no risk of an import error caused by a data type 632 of the set 602 that has no mapping to a data type in the importing peer's ontology 106.

A data type defined in the exporting peer's ontology 611 is or is not also defined in the importing peer's ontology 106. If the data type is also defined in the importing peer's ontology 106, then the ontology map 110 is not needed to map the data type when importing data 631 of that data type. On the other hand, if the data type is not defined in the importing peer's ontology 106, then the importing peer 102 uses a rule or rules in the ontology map 110 in an attempt to map the data type to one defined in the importing peer's ontology 106. Example mapping rules are described in greater detail below.

At step 504, after verifying that each data type defined in the exporting peer's ontology 611 can be mapped to a data type in the importing peer's ontology 106, the importing peer 102 imports the set of database changes 620 into the importing peer's database copy 104. This importing includes mapping data types 632 of data 631 in the set of database changes 620 to data types in the importing peer's ontology 106. Recall that the data types 632 specified in the update 601 are defined according to the exporting peer's ontology 105, some of which may not also be defined in the importing peer's ontology 106. For these data types that are not defined in both the exporting peer's ontology 105 and the importing peer's ontology 106, the ontology map 110 is used by the importing peer during import of the update 601 to map these data types from the exporting peer's ontology 105 to the importing peer's ontology 106. As a result, all data 631 of the update 601 imported into the importing peer's database copy 104 is typed according to the importing peer's ontology 106 even though that data 631, when sent in the update 601, was typed according to the exporting peer's ontology 106. Both the exporting peer 101 and the importing peer 102 can separately maintain differing ontologies yet still share data with each other as part of a replication scheme through the ontology map.

Ontology Map Examples

As described above with respect to an embodiment, the exporting peer 101, when exporting a set of database changes, exports the data types of data included in the set of database changes (e.g., objects, properties, and links) as the data is typed in the exporting peer's database copy 103 (i.e., according to the exporting peer's ontology 105). The ontology map 110 can specify certain data types in the exporting peer's ontology 105 that are to be dropped during export (i.e., no data of those types is included in the exported data). This drop feature can be used to prevent the exporting peer 101 from sharing database changes that cannot be representing according to the importing peer's ontology 106.

The importing peer 102, when importing a set of database changes, begins with the data types of the data in the set of database changes as they are defined by the exporting peer 101 according to the exporting peer's ontology 105. One or more of these data types may not be defined in the importing peer's ontology 106. The ontology map 110 is used by the importing peer to map these data types to ones defined in the importing peer's ontology 106. In one embodiment, an ontology map 1110 can specify pairs of data types that map to each other (one-to-one mapping), parent-child relationships (one-to-many mappings), and a list of data types to drop on export.

Peer Information Section

In one embodiment, an ontology map 110 includes a peer information section. The peer information section comprises two system identifiers identifying two sites (e.g., 101 and 102) configured in a peering relationship (i.e., two sites configured to share database changes with each other as part of a multi-master replication topology). When a site (e.g., 101, 102, etc.) is configured with an ontology map 110, the peer information section is read to verify that the ontology map 110 applies to the site being configured. During configuration of a site (Site A) with an ontology map 110, if one of the system identifiers in the peer information section identifies the site being configured with the ontology map 110 (i.e., identifies Site A), then the site (Site A) verifies that the other system identifier in the peer information section identifies a site (Site B) that the configuring site (Site A) is configured to share database changes with. If both these conditions are met, then the ontology map 110 applies to the configuring site (Site A).

The other site (Site B) performs a similar process to determine if an ontology map 110 it is being configured with applies to it.

In accordance with an embodiment, the peer information section is specified in the ontology map as follows:

```
<peerInformation>
    <systemId>SYSTEM_ID1</systemId>
    <systemId>SYSTEM_ID2</systemId>
</peerInformation>
```

Dropped Types

In one embodiment, the ontology map 110 specifies the list of data types to be dropped by the exporting peer 101 when exporting a set of database changes. This list can be added to or amended as needed by an administrator at the exporting peer 101. Before the import/export logic 120 of the exporting peer 101 shares a set of database changes with the importing peer 102, the logic 120 removes all database changes from the set that have a data type on the list of data types to be dropped. As a result, sharing of database changes for which no corresponding data type is defined in the importing peer's ontology 106 is prevented. This prevents errors and failures at the importing peer when importing the set of database changes. Further, this allows the ontology 105 of the exporting peer 101 to be extended (i.e., new types added) before it has been determined how the new types will map to data types in the ontology 106 of the importing peer 102. Meanwhile, sharing of database changes between the peers with respect to other data types can continue.

In accordance with an embodiment, the list of data types to be dropped by the exporting peer 101 when exporting a set of database changes is specified in the ontology map 110 using the following XML syntax:

```
<droppedUri>
    <systemId>SYSTEM_ID</systemId>
    <uri>URI1</uri>
</droppedUri>
<droppedUri>
    <systemId>SYSTEM_ID</systemId>
    <uri>URI2</uri>
</droppedUri>
...
<droppedUri>
    <systemId>SYSTEM_ID</systemId>
    <uri>URIN</uri>
</droppedUri>
```

The <droppedUri> element contains a data type to drop on export. The <systemId> element contains a value SYSTEM_ID that identifies the site that is to drop the listed data type when exporting. An ontology map 110 can specify multiple drop data types lists for multiple sites. For example, ontology map 110 may specify a drop data types list for site 101 and another drop data types list for site 102. Each site separately consults its list in the map 110 when exporting a set of database changes. Each data type to be dropped is identified as a value of a <uri> element. In one embodiment, the value of a <uri> element is a Uniform Resource Indicator (URI) that uniquely identifies the data type within the exporting site's ontology. Dropped types can include object types, property types, and link types, for example.

One-to-One Mapping

In one embodiment, the ontology map 110 specifies a one-to-one data type mapping. In a one-to-one data type mapping, a single data type from the exporting peer's ontology 105 is mapped to a single data type in the importing peer's ontology 106. In an embodiment, a one-to-one mapping is specified using the following syntax:

```
<oneToOneMapping mappingType="[link|object|property]">
    <uri>URI1</uri>
    <uri>URI2</uri>
</oneToOneMapping>
```

In the above example mapping specification, the mappingType attribute of the <oneToOneMapping> element specifies whether the mapping applies to a link type, an object type, or a property type. The order of the <uri> child elements of the <oneToOneMapping> element corresponds to the order of the <systemId> child elements of the <peerInformation> element. Thus, URI1 is a data type defined in SYSTEM_ID1's ontology and URI2 is a data type defined in SYSTEM_ID2's ontology. Further, URI1 and URI2 should be for the same mappingType (i.e., link, object, or property). For example, if the mappingType specifies that the one-to-mapping applies to a "property", then both URI1 and URI2 should be a property data type. As used herein, URI refers to Uniform Resource Indicator. In one embodiment, a URI is a string that uniquely identifies a data type within an ontology. In one embodiment, a oneToOneMapping is bi-directional. For example, URI1 will be mapped to URI2 when SYSTEM_ID2 is the importing peer and URI2 will be mapped to URI1 when SYSTEM_ID1 is the importing peer.

One-to-One Mapping With Reverse Link Feature

In one embodiment in which a one-to-one mapping is specified for a link mapping type, the importing peer 102 reverses a link connecting two data objects represented by link data 631 in the database update 601 before importing the link data 631 into the importing peer's database copy 104. Such a mapping may be useful if opposite asymmetrical link types are defined in two peering ontologies. For example, the exporting peer's ontology 105 may define a "Parent Of" link type but not define a "Child Of" link type while the importing peer's ontology 106 may define a "Child Of" link type but not define a "Parent Of" link type. If the importing peer 102 mapped the "Parent Of" link to the "Child Of" link without reversing the link represented by the link data 631 before importing the link data 631 into the importing peer's database copy 104, then, after the import, "Child Of" links 202 connecting data objects 201 in the importing peer's database copy 104 would incorrectly reflect the direction of the child of relationship between the data objects.

In accordance with one embodiment, the following syntax is used in the ontology map 110 to specify a one-to-one mapping with reversed links:

```
<oneToOneMapping mappingType="link" reverseLink="true">
    <uri>URI1</uri>
    <uri>URI2</uri>
</oneToOneMapping>
```

One-to-Many Mapping

In some ontologies, there is a hierarchy of object types available for classifying (typing) data objects. For example, an ontology may define a super-object type "Person" with sub-object types "Employee" and "Contractor". The "Person" object type is referred to as a "super" object type and "Employee" and "Contractor" object types are referred to as "sub" object types because a data object of type "Employee" or type "Contractor" is also of type "Person" but a data object of type "Person" may not be of type "Employee" or type "Contractor". Assume this hierarchy is defined in site A's ontology but that site B's ontology only defines the object type "Person" and does not define the object types "Employee" and "Contractor". Given these ontologies, after exporting a data object O of object type "Employee" from the database copy at site A to site B, it may be desirable for site B, on import to map object type "Employee" to object type "Person". Further, when site B exports data object O back to site A, it would desirable for site A on import to map object type "Person" back to object type "Employee", if appropriate to do so (i.e., if the data type of object O has not changed in the meantime).

In an embodiment, the type of object O in site A's database copy is retained when site B exports object O back to site A if the type of object O in site A's database copy is, according to the ontology map, a child type of the type of object O as exported by site B. For example, if site B exports object O as type "Person" and in site A's database copy object O has type "Employee", then site A will retain type "Employee" for object O in its database copy provided the ontology map specifies that the "Employee" type is a child type of the "Person" type. Note that the specification of a parent and child types in a one-to-many mapping in the ontology map is independent of whether those types are super and sub-types according to the parent site ontology or the child site ontology. For example, the "Employee" type may be specified as a child type of type "Person" in a one-to-many mapping yet the "Employee" type may not be defined as a sub-type of type "Person" in either site A's ontology or site B's ontology.

In accordance with an embodiment, a one-to-many mapping is specified in an ontology map using the following syntax:

```
<oneToManyMapping mappingType="[link|object|property]">
  <parentSystemId>SYSTEM_ID</parentSystemId>
  <parentUri>PARENT_URI</parentUri>
  <childUri>CHILD_URI1</childUri>
  <childUri>CHILD_URI2</childUri>
  ...
</oneToManyMapping>
```

In this example, SYSTEM_ID is one of the two system identifiers specified in the peer information section of the ontology map. The SYSTEM_ID site (parent site) defines the PARENT_URI type in its ontology (e.g., site B defines type "Person"). The other site specified in the peer information section defines at least all of the CHILD_URI types (e.g., site A defines types "Employee" and "Contractor").

Before importing an object (e.g., object O) exported from the parent site (e.g., Site B) into the child site's (e.g., Site A) database copy, a check is performed by the child site. In particular, the child site checks that the type of the object as stored in the child site's database copy is, according to the one to many mapping in the ontology map, a child type of the type exported from the parent site. For example, if object O as stored in the Site A's database copy is of type "Employee" and Site B exports object O as type "Person", then, before importing object O as exported by Site B into Site A's database copy, Site A will check that type "Employee" is, according to the one to many mapping, a child type of type "Person". If it is, then the "Employee" type for object O in Site A's database copy will be retained during the import even though object O was exported from Site B as type "Person". Otherwise, Site A will set the type of object O in Site A's database copy to be type exported by Site B (e.g., "Person").

The PARENT_URI type need not be defined by the child site's ontology. For example, type "Person" may be defined by Site A's ontology. On import, the child site can compare (e.g., by a string comparison) the data type 632 specified in the update item 621 to the PARENT_URI type of the one-to-many mapping to determine if the mapping applies to the update item 621. In this case where the PARENT_URI type is not defined in the child site's ontology, the ontology map may specify a one to one mapping for the PARENT_URI type as a fallback mapping in the event a data type 632 of type PARENT_URI cannot be mapped under the one to many mapping to a CHILD_URI type. For example, if the type of object O in Site A's database copy before import is neither "Employee" nor "Contractor" and object O is exported from Site B as type "Person", then Site A, on import, may fallback to a one to one mapping in order to map type "Person" to another type defined in Site A's ontology.

A one-to-many mapping can be applied to links and objects independent of whether hierarchical types are supported by the ontology. In particular, a one-to-many mapping may be used to retain the type of an object, property, or link in the child site's database copy when the object is exported back to the child site from the parent site irrespective of whether the parent site's ontology or the child site's ontology defines the retained type as a sub-type of the exported type.

Further, a one-to-many mapping can be applied to any type hierarchy. As an example, suppose a V→W→X1→X2→Y→Z (parent→child) object type hierarchy exists in site A's ontology. Further assume the following one-to-many mapping in which site A is the child system and a site B is the parent system:

```
<oneToManyMapping mappingType="[link|object|property]">
  <parentSystemId>SYSTEM_ID</parentSystemId>
  <parentUri>W</parentUri>
  <childUri>Y</childUri>
  ...
</oneToManyMapping>
```

Under this mapping, there are many possible type relationships between an object O's original type T at site A and object O's type T' as exported back to site A from site B. If T' is type W and T is type Y, then in accordance with one embodiment, site A should retain the more specific type on import (i.e., type Y). However, if type T' is a sub-type of W (e.g., T' is type X1) or a super-type of W (e.g., T' is type V), then in accordance with one embodiment site A assumes that the type for object O was changed at site B and thus does not retain the existing type for object O in site A's database copy on import.

Pre-Export Peer Ontology Validation

In one embodiment as shown in FIG. 3, a property type 316 of an ontology specifies a base or primitive type 320 (e.g., string, number, etc.) and one or more components 318 that accept an input property value 300 and transforms it in different ways to produce a final property value that is stored in the database copy as the property value. For example, a component 318 of a "Phone Number" property type could employ a parser 302 (e.g., a regular expression parser 304A or a code module parser 304B) that attempts to format the raw input property value into a string of the form "(XXX) XXX-XXXX". Thus, the base type 320 and the components 318 can be considered to be part of the ontology.

Two property types that are mapped to each other in an ontology map may have different base types 320 in different ontologies or employ different components 318 in different ontologies. For example, property type "com.siteA.PhoneNumber" as defined in site A's ontology may be mapped to property type "com.siteB.PhoneNumber" as defined in site B's ontology in an ontology map. Property type "com.siteA.PhoneNumber" as defined in site A's ontology may have a number base type 320 while property type "com.siteB.PhoneNumber" as defined in site B's ontology may have a string base type 320. Even where mapped property types have the same base type 320, the respective types may have differing components 318 in different ontologies. For example, in site A's ontology, property type "com.siteA.PhoneNumber" may have a component 318 that attempts to format (parse) raw input values into a string of the form "(XXX) XXX-XXXX" while, in site B' ontology, property type "com.siteB.PhoneNumber" may have a component 318 that attempts to format (parse) raw input values into a string of the form "XXXXXXXXXX".

Differences in base types 320 and differences in components 318 between ontologies, even where the ontology map specifies a mapping between property types, can cause import errors at the importing peer. As one example, two mapped property types can have incompatible base types. For example, if property type "com.siteA.PhoneNumber" in site A's ontology has a string base type and property type "com.siteB.PhoneNumber" in site B's ontology, to which property type "com.siteA.PhoneNumber" is mapped in the ontology map, has a number base type, then site B may not be able to import data exported by site A of type "com.siteA.PhoneNumber" if the exported data cannot be converted at site B from a string to a number.

In accordance with one embodiment, the exporting peer performs pre-export validation on properties to be exported using the importing peer's ontology. By doing so, importing errors at the importing peer resulting from mapped property types having differing base types 302 or differing components 318 can be avoided.

Figure 7A:
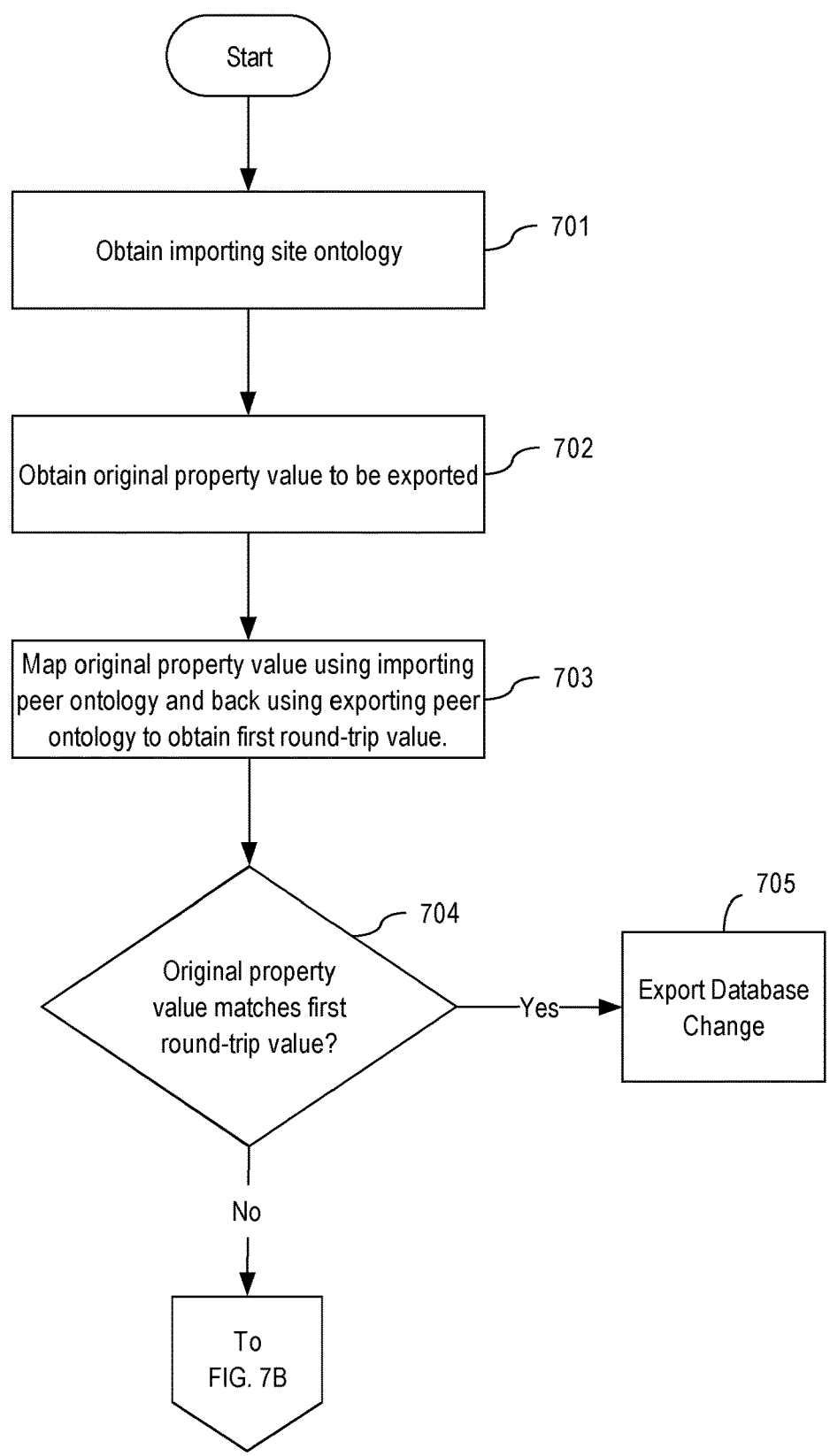
FIG. 7 (consisting of FIGS. 7A and 7B) illustrates pre-export peer ontology validation.

Referring now to FIG. 7, a method 700 provides pre-export peer ontology validation according to an embodiment. Method 700 is performed by the import/export logic 120 of the exporting peer 101 prior to exporting a set of database changes 620 in which one or more of the set of database changes 620 to be exported are for properties 203. For example, steps of method 700 might be performed after the exporting peer 101 has updated the value of a phone number property 203 in the exporting peer's database copy 103 and is now about to export the updated phone number property to the importing peer 102. The basic approach of method 700 is to simulate, prior to exporting a database update 621 for a property 203, how a given property value of the property 203 would change according to the exporting peer ontology 105 and the importing peer ontology 106 when the given property value is exported to the importing peer 102 and back to the exporting peer 101. In other words, the basic approach of method 700 is to simulate how the given property value would change when making a replication round-trip from the original exporting peer 101 to the importing peer 102 and back to the original exporting peer 101. If the given property would not change after one round-trip or if the given property value would stabilize after two round trips, then the given property value can be safely exported from the exporting peer 101 to the importing peer 102 even if the respective property type definitions in the respective ontologies 105 and 106 differ in base type 320 or components 316.

At step 701, the exporting peer 101 obtains the importing peer's ontology 106. In one embodiment, the exporting peer 101 is configured with the importing peer's ontology 106 at the same time it is configured with the ontology map 110.

At step 702, the exporting peer 101 obtains a property value to be exported to the importing peer 102. For example, the exporting peer 101 may obtain the property value as part of step 401 of FIG. 4 in which the exporting peer 101 determines a set of database changes 620 to share with the importing peer 102.

At step 703, the exporting peer 101 maps the property value according to the importing peer's ontology 106 to an intermediate value and maps the intermediate value according to exporting peer's ontology 105 to obtain a first round-trip value. The first-round trip value represents how the property value to be exported would change if exported to the importing peer, incorporated into the importing peer's database copy 104 according to the importing peer's ontology 106, and the incorporated value exported back to the exporting peer 101 and incorporated back into the exporting peer's database copy 103 according to the exporting peer's ontology 105. This mapping includes mapping the property type 316 of the property value according to the exporting peer's ontology 105 to a property type 316 in the importing peer's ontology 106, using the ontology map 110 if necessary. The original property value to be exported is then transformed according to the base type 320 and any components 318 defined by the property type 316 of the property in the importing peer's ontology 106 to produce the intermediate value. For example, if the base type 320 defined by the property type 316 of the value in the importing peer's ontology 106 is a number, then the exporting peer 101 will attempt to convert (cast) the original property value to a number. The intermediate value is then transformed according to the base type 320 and any components 318 defined by the property type 316 of the property in the exporting peer's ontology 105 to produce the first round-trip value. For example, if the base type 320 defined by the property type 316 of the property in the exporting peer's ontology 105 is a string, then the exporting peer 101 will attempt to convert (cast) the intermediate value to a string.

At step 704, the original property value to be exported is compared to the first round-trip value. If they are the same, then the property can be safely exported to the importing peer and the exporting peer 101 does so at step 705. If they are not the same or an error occurred in simulating the first round-trip, then the mapping in the ontology map 110 for the property may be incompatible. If an error did not occur in producing the first round-trip value but the original property value and the first round-trip value are not the same, the property may still be safely exported provided the property value will eventually stabilize over multiple round trips. For example, consider a "Name" property type 316 defined in the importing peer's ontology 106 of a string base type 320 that has a component 318 that prepends the string "Mr." if the value of the property is determined to be a male name and prepends the string "Ms." if the value of the property is determined to be a female name. Further assume that the component 318 will not prepend "Mr." or "Ms." if one of those honorifics is already prepended. In this example, a property value that is originally exported as "John Smith" will eventually stabilize to "Mr. John Smith" after two round trips. Accordingly, in one embodiment, the exporting peer 101, when the first round trip value does not match the original property value, simulates a second round-trip at step 706. If, at step 707, the second round-trip value matches the first round-trip value, then the database change can be safely exported to the importing peer 102 and at step 708 the exporting peer 101 exports the database change. Otherwise, the exporting peer 101 at step 709 determines that there is an incompatible type mapping for the property in the ontology map 110.

Implementing Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
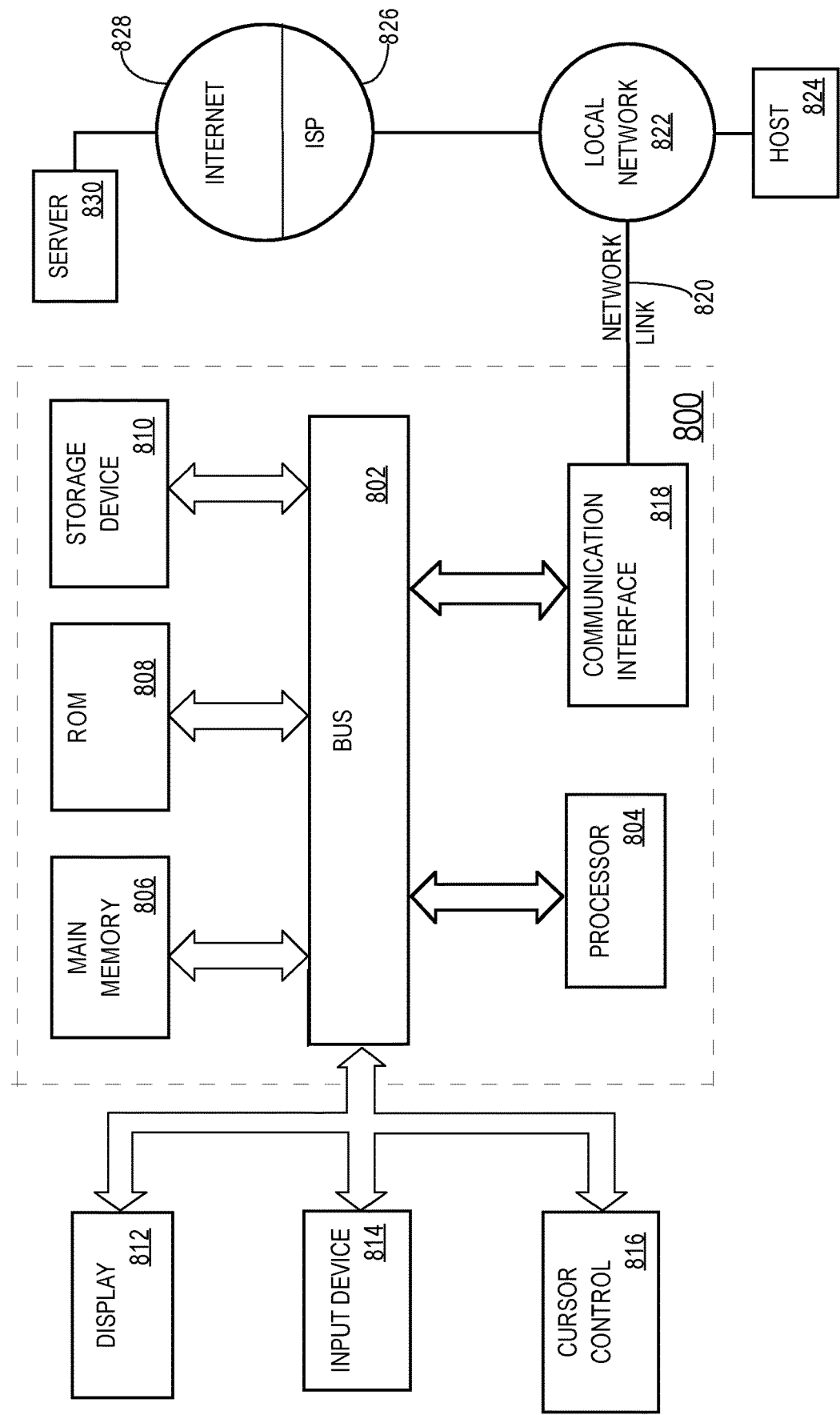
FIG. 8 illustrates a computer system with which an embodiment may be implemented.

For example, FIG. 8 is a block diagram that illustrates a computer system 800 upon which an embodiment may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "non-transitory media" as used herein refers to any media that store data and/or instructions that cause a machine to operation in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
storing a database change comprising a property value, the property value having an exporting site property type as defined in an exporting site ontology for an exporting site;
mapping the exporting site property type to an importing site property type defined by an importing site ontology for an importing site based on an ontology map comprising a one-to-one mapping between data types defined by the exporting site ontology and data types defined by the importing site ontology;
transforming the property value to an intermediate property value based on the importing site property type to simulate incorporating the property value into the importing site;
transforming the intermediate property value to a first round-trip value based on the exporting site property type to simulate incorporating the intermediate property value into the exporting site;
determining that the property value and the first round-trip value are different;
transforming the first round-trip value to a second intermediate value based on the importing site property type;
transforming the second intermediate value to a second round-trip value based on the exporting site property type;
determining whether to export the database change to the importing site based at least in part on a comparison between the first round-trip value and the second round-trip value;
exporting the database change to the importing site when the first round-trip value and the second round-trip value match,
wherein the method is performed by one or more computing devices.

2. The method of claim 1, further comprising determining to export the database change to the importing site in response to determining that the property value and the first round-trip value are the same.

3. The method of claim 1, further comprising flagging an incompatible mapping of the ontology map when the first-round trip value and the second-round trip value differ.

4. The method of claim 1,
wherein exporting the database change at the importing site comprises exporting based at least in part on the one-to-one mapping.

5. The method of claim 1, further comprising flagging an incompatible mapping when the property value and the first round-trip value differ.

6. One or more non-transitory computer readable storage media storing instructions which, when executed, cause performance of:
storing a database change comprising a property value, the property value having an exporting site property type as defined in an exporting site ontology for an exporting site;
mapping the exporting site property type to an importing site property type defined by an importing site ontology for an importing site based on an ontology map comprising a one-to-one mapping between data types defined by the exporting site ontology and data types defined by the importing site ontology;
transforming the property value to an intermediate property value based on the importing site property type to simulate incorporating the property value into the importing site;
transforming the intermediate property value to a first round-trip value based on the exporting site property type to simulate incorporating the intermediate property value into the exporting site;
determining that the property value and the first round-trip value are different;
transforming the first round-trip value to a second intermediate value based on the importing site property type;
transforming the second intermediate value to a second round-trip value based on the exporting site property type;
determining whether to export the database change to the importing site based at least in part on a comparison between the first round-trip value and the second round-trip value;
exporting the database change to the importing site when the first round-trip value and the second round-trip value match.

7. The one or more non-transitory computer readable storage media of claim 6, wherein the instructions, when executed, cause determining to export the database change to the importing site in response to determining that the property value and the first round-trip value are the same.

8. The one or more non-transitory computer readable storage media of claim 6, wherein the instructions, when executed, cause flagging an incompatible mapping of the ontology map when the first-round trip value and the second-round trip value differ.

9. The one or more non-transitory computer readable storage media of claim 6,
wherein exporting the database change at the importing site comprises exporting based at least in part on the one-to-one mapping.

10. The one or more non-transitory computer readable storage media of claim 6, wherein the instructions, when executed, cause flagging an incompatible mapping when the property value and the first round-trip value differ.

11. A system comprising:
one or more processors;
one or more non-transitory computer readable storage media coupled to the one or more processors and comprising logic configured to:
store a database change comprising a property value, the property value having an exporting site property type as defined in an exporting site ontology for an exporting site;
map the exporting site property type to an importing site property type defined by an importing site ontology for an importing site based on an ontology map comprising a one-to-one mapping between data types defined by the exporting site ontology and data types defined by the importing site ontology;
transform the property value to an intermediate property value based on the importing site property type to simulate incorporating the property value into the importing site;
transform the intermediate property value to a first round-trip value based on the exporting site property type to simulate incorporating the intermediate property value into the exporting site;
determining that the property value and the first round-trip value are different;
transforming the first round-trip value to a second intermediate value based on the importing site property type;
transforming the second intermediate value to a second round-trip value based on the exporting site property type;

determining whether to export the database change to the importing site based at least in part on a comparison between the first round-trip value and the second round-trip value;

exporting the database change to the importing site when the first round-trip value and the second round-trip value match.

12. The system of claim 11, wherein the logic is configured to determine to export the database change to the importing site in response to determining that the property value and the first round-trip value are the same.

13. The system of claim 11, wherein the logic is configured to flag an incompatible mapping of the ontology map when the first-round trip value and the second-round trip value differ.

14. The system of claim 11, wherein the logic is configured to flag an incompatible type mapping when the property value and the first round-trip value are different.

15. The system of claim 11, wherein exporting the database change at the importing site comprises exporting based at least in part on the one-to-one mapping.

\* \* \* \* \*

UNITED STATES PATENT AND TRADEMARK OFFICE
CERTIFICATE OF CORRECTION

| | |
|---|---|
| PATENT NO. | : 11,693,877 B2 |
| APPLICATION NO. | : 16/053445 |
| DATED | : July 4, 2023 |
| INVENTOR(S) | : Richard Allen Ducott, III et al. |

It is certified that error appears in the above-identified patent and that said Letters Patent is hereby corrected as shown below:

On the Title Page

Page 2, the "References Cited" Column 1, Line 1, under the "U.S. Patent Documents" portion, beginning of the portion, the following line should be inserted:
--US 4,853,843 A 8/1989 Ecklund--

Page 4, the "References Cited" Column 1, Line 1, under the "Foreign Patent Documents" portion, beginning of the portion, the following line should be inserted:
--AU 2011279270 9/2015--

Page 6, the "References Cited" Column 1, Line 7, under the "Other Publications" portion, between entries "Official Communication for European Patent Application No. 2,666,364 dated Oct. 3, 2013." and "Official Communication for European Patent Application No. 13152370.6 dated Jun. 3, 2013." the following line should be inserted:
--International Search Report and Written Opinion for PCT/US2011043794 dated 24 February 2012.--

Signed and Sealed this
Fourteenth Day of May, 2024

Katherine Kelly Vidal
*Director of the United States Patent and Trademark Office*